US008860752B2

(12) United States Patent
Doepke

(10) Patent No.: US 8,860,752 B2
(45) Date of Patent: Oct. 14, 2014

(54) MULTIMEDIA SCRIPTING

(75) Inventor: Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2022 days.

(21) Appl. No.: 11/457,364

(22) Filed: Jul. 13, 2006

(65) Prior Publication Data

US 2008/0016491 A1   Jan. 17, 2008

(51) Int. Cl.
*G09G 5/00* (2006.01)
*G06T 13/00* (2011.01)
*G06T 17/00* (2006.01)
*G06F 9/455* (2006.01)
*G06T 11/60* (2006.01)

(52) U.S. Cl.
CPC .............. *G06T 13/00* (2013.01); *G06T 17/005* (2013.01); *G06F 9/45512* (2013.01); *G06T 11/60* (2013.01)
USPC ........... 345/619; 345/501; 345/503; 345/531; 345/582; 345/589; 345/473; 345/474

(58) Field of Classification Search
CPC .... G06T 2210/61; G06T 17/005; G06T 11/60
USPC .......................... 345/531, 503, 582, 473, 619; 717/104–145
See application file for complete search history.

(56) References Cited

U.S. PATENT DOCUMENTS

| 6,339,839 B1 * | 1/2002 | Wang ............................ 717/146 |
| 6,369,821 B2 * | 4/2002 | Merrill et al. ................. 345/473 |
| 6,457,019 B1 | 9/2002 | Sexton et al. |
| 6,614,430 B1 * | 9/2003 | Rappoport .................... 345/420 |
| 6,668,354 B1 | 12/2003 | Chen et al. |
| 6,889,374 B1 * | 5/2005 | Wainwright .................. 717/115 |
| 6,999,068 B2 | 2/2006 | Sobol |
| 6,999,207 B2 | 2/2006 | Nakane |
| 7,006,702 B2 | 2/2006 | Kondo |
| 7,030,872 B2 | 4/2006 | Tazaki |
| 7,039,876 B2 | 5/2006 | Lavendel et al. |
| 7,062,714 B1 | 6/2006 | Mo et al. |

(Continued)

FOREIGN PATENT DOCUMENTS

| WO | 2005/083595 A3 | 9/2005 |
| WO | 2005/106652 A1 | 11/2005 |
| WO | 2005/106785 A1 | 11/2005 |
| WO | 2006/007251 A3 | 1/2006 |

OTHER PUBLICATIONS

Microsoft Windows Presentation Foundation Page at: http://www.msdn.microsoft.com/winfx/technologies/presentation/default.aspx, Jun. 16, 2006.

(Continued)

*Primary Examiner* — Jin-Cheng Wang
(74) *Attorney, Agent, or Firm* — Kenyon & Kenyon LLP

(57) ABSTRACT

Disclosed are methods and systems for multimedia scripting, including evaluating a script at runtime and invoking a process for editing multimedia in dependence upon the script. Multimedia may include a still image and video images. Multimedia scripting may also include accepting text entered into a text-input graphical user interface as a script for runtime evaluation, accepting from a non-text-based graphical user interface a designation of scripts for runtime evaluation, and effecting a disposition of the edited multimedia in dependence upon a script, such as storing the multimedia as a file, presenting the multimedia, or encoding the edited multimedia as an email attachment.

41 Claims, 14 Drawing Sheets

(56) References Cited

U.S. PATENT DOCUMENTS

| | | | |
|---|---|---|---|
| 7,076,774 | B2 | 7/2006 | Chrysanthakopoulos et al. |
| 7,382,380 | B1* | 6/2008 | Crosby et al. .................. 345/619 |
| 2002/0008703 | A1* | 1/2002 | Merrill et al. .................. 345/473 |
| 2005/0038326 | A1 | 2/2005 | Mathur |
| 2005/0052469 | A1* | 3/2005 | Crosby et al. .................. 345/619 |
| 2005/0140694 | A1* | 6/2005 | Subramanian et al. ........ 345/619 |
| 2005/0179705 | A1 | 8/2005 | Ubillos et al. |
| 2005/0231502 | A1 | 10/2005 | Harper et al. |
| 2005/0231514 | A1 | 10/2005 | Harper et al. |
| 2005/0231516 | A1* | 10/2005 | Zimmer ........................ 345/531 |
| 2005/0231521 | A1 | 10/2005 | Harper |
| 2005/0232507 | A1 | 10/2005 | Zimmer |
| 2005/0273420 | A1* | 12/2005 | Subramanian .................. 705/37 |
| 2005/0285866 | A1 | 12/2005 | Brunner et al. |
| 2005/0285867 | A1 | 12/2005 | Brunner et al. |
| 2005/0285965 | A1 | 12/2005 | Zimmer et al. |
| 2005/0286794 | A1 | 12/2005 | Brunner et al. |
| 2005/0289519 | A1 | 12/2005 | Sazegari et al. |
| 2006/0195461 | A1* | 8/2006 | Lo et al. ......................... 707/100 |
| 2007/0085854 | A1* | 4/2007 | Zimmer et al. ............... 345/582 |
| 2007/0174827 | A1* | 7/2007 | Harper .......................... 717/144 |
| 2007/0182747 | A1* | 8/2007 | Harper et al. ................. 345/503 |

OTHER PUBLICATIONS

Adobe Photoshop Product Page at: http://www.adobe.com/products/photoshop/, Nov. 27, 1999.

Microsoft Expression Interactive Designer Product Page at: http://www.microsoft.com/products/expression/en/interactive_designer/default.mspx, Feb. 3, 2006.

XML User Interface Language Project Documentation Page at: http://www.mozilla.org/projects/xul/, Aug. 19, 2001.

World Wide Web Consortium Scalable Vector Graphics Information Page at: http://www.w3.org/Graphics/SVG/, May 8, 1999.

U.S. Appl. No. 10/770,153, entitled "Method and System for Dynamic Signal Analysis and Filtering" filed Feb. 2, 2004; Normile, et al.

U.S. Appl. No. 11/562,878, entitled "Manipulation of Text and Graphic Appearance" filed Dec. 23, 2004; Zimmer, et al.

U.S. Appl. No. 11/095,013, entitled "Encoding a Transparency (Alpha) Channel in a Video Bitstream" filed Mar. 31, 2005; Haskell, et al.

U.S. Appl. No. 11/113,656, entitled "Bayer Reconstruction of Images Using a GPU" filed Apr. 25, 2005; Brunner et al.

U.S. Appl. No. 11/113,658, entitled "Multi-Conic Gradient Generation" filed Apr. 25, 2005; Zimmer et al.

U.S. Appl. No. 11/251,215, entitled "System and Method for Computing a Desktop Picture" filed Oct. 14, 2005; Zimmer et al.

U.S. Appl. No. 11/261,240, entitled "Resampling Chroma Video Using a Programmable Graphics Processing Unit to Provide Improved Color Rendering" filed Oct. 27, 2005; Gies.

U.S. Appl. No. 11/261,382, entitled "Resampling Selected Colors of Video Information Using a Programmable Graphics Processing Unit to Provide Improved Color Rendering on LCD Displays" filed Oct. 27, 2005; Gies.

* cited by examiner

High-level Code Examples:

1. Allocate 51
2. Apply 52 to 51, parameters = (X, Y, Z, W), input = 51 (Sea Shore image), output = [place holder] CC sea shore
3. Apply 53, parameters (X, Y, Z, W), input = cc sea shore, output = [place holder] FC CC sea shore
4. Apply 54, parameters (X, Y, Z, W), input buffer 53, input Sea Shore image, output = [place holder] sea shore result

| CPU | GPU |
|---|---|
| Time 1 | Frame 1 | Prior Task |
| Time 2 | Frame 2 | Frame 1 |
| Time 3 | Frame 3 | Frame 2 |
| Time 4 | Frame 4 | Frame 3 |
| Time 5 | Frame 5 | Frame 4 |
| Time 6 | Frame 6 | Frame 5 |
| Time 7 | Frame 7 | Frame 6 |

7(b)

| | P1 | P2 | P3 | P4 |
|---|---|---|---|---|
| Time 1 | Frame 1 | | | |
| Time 2 | Frame 2 | Frame 1 | | |
| Time 3 | Frame 3 | Frame 2 | Frame 1 | |
| Time 4 | Frame 4 | Frame 3 | Frame 2 | Frame 1 |
| Time 5 | Frame 5 | Frame 4 | Frame 3 | Frame 2 |
| Time 6 | Frame 6 | Frame 5 | Frame 4 | Frame 3 |
| Time 7 | | Frame 6 | Frame 5 | Frame 4 |

FIGURE 7(c)

| | CPU | GPU |
|---|---|---|
| Time 1 | Frame 1, effect 1 | |
| Time 2 | Frame 2, effect 1 | Frame 1, effect 2 |
| Time 3 | Frame 1, effect 3 | Frame 2, effect 2 |
| Time 4 | Frame 2, effect 3 | Frame 1, effect 4 |
| Time 5 | Frame 3, effect 1 | Frame 2, effect 4 |
| Time 6 | Frame 4, effect 1 | Frame 3, effect 2 |
| Time 7 | Frame 3, effect 3 | Frame 4, effect 2 |
| Time 8 | Frame 4, effect 3 | Frame 3, effect 4 |
| | | Frame 4, effect 4 |

MULTIMEDIA SCRIPTING

CROSS-REFERENCE TO RELATED APPLICATIONS

The present application hereby incorporates herein by reference the complete subject matter of the following commonly-assigned U.S. patent applications in their entirety:

U.S. patent application Ser. No. 10/770,153 entitled METHOD AND SYSTEM FOR DYNAMIC SIGNAL ANALYSIS AND FILTERING, filed Feb. 2, 2004 by James Normile et al.;

U.S. patent application Ser. No. 10/777,962 entitled NAVIGATION WITHIN A LARGE COMPUTER FILE, filed Feb. 12, 2004 by Randy Ubillos et al.;

W.O. Patent application Ser. No. PCT/US2004/36843 entitled NAVIGATION WITH A LARGE COMPUTER FILE, filed Nov. 5, 2004 by Randy Ubillos et al.;

U.S. patent application Ser. No. 10/877,358 entitled DISPLAY-WIDE VISUAL EFFECTS FOR A WINDOWING SYSTEM USING A PROGRAMMABLE GRAPHICS PROCESSING UNIT, filed Jun. 25, 2004 by Ralph Brunner and John Harper;

U.S. patent application Ser. No. 10/957,557 entitled PARTIAL DISPLAY UPDATES IN A WINDOWING SYSTEM USING A PROGRAMMABLE GRAPHICS PROCESSING UNIT, filed Oct. 1, 2004 by Ralph Brunner and John Harper;

W.O. patent application Ser. No. PCT/US2005/019108 entitled DISPLAY-WIDE VISUAL EFFECTS FOR A WINDOWING SYSTEM USING A PROGRAMMABLE GRAPHICS PROCESSING UNIT, filed Jun. 1, 2005 by Ralph Brunner and John Harper;

U.S. patent application Ser. No. 10/826,762 entitled HIGH-LEVEL PROGRAM INTERFACE FOR GRAPHICS OPERATIONS, filed Apr. 16, 2004 by John Harper et al.;

W.O. patent application Ser. No. PCT/US05/08804 entitled HIGH-LEVEL PROGRAM INTERFACE FOR GRAPHICS OPERATIONS, filed Mar. 16, 2005 by John Harper et al.;

U.S. patent application Ser. No. 10/866,360 entitled SYSTEM AND METHOD FOR PROCESSING GRAPHICS OPERATIONS WITH GRAPHICS PROCESSING UNIT, filed Jun. 11, 2004 by Mark Zimmer;

W.O. patent application Ser. No. PCT/US05/08805 entitled SYSTEM AND METHOD FOR PROCESSING GRAPHICS OPERATIONS WITH GRAPHICS PROCESSING UNIT, filed Mar. 16, 2005 by Mark Zimmer;

U.S. patent application Ser. No. 10/826,596 entitled BLUR COMPUTATION ALGORITHM, filed Apr. 16, 2004 by Mark Zimmer;

U.S. patent application Ser. No. 10/826,744 entitled SYSTEM FOR EMULATING GRAPHICS OPERATIONS, filed Apr. 16, 2004 by John Harper;

U.S. patent application Ser. No. 10/876,298 entitled USER-INTERFACE DESIGN, filed Jun. 24, 2004 by Mark Zimmer et al.;

U.S. patent application Ser. No. 10/876,039 entitled GAUSSIAN BLURS APPROXIMATION SUITABLE FOR GPU, filed Jun. 24, 2004 by Ralph Brunner et al.;

U.S. patent application Ser. No. 10/825,694 entitled SYSTEM FOR OPTIMIZING GRAPHICS OPERATIONS, filed Apr. 16, 2004 by John Harper et al.;

U.S. patent application Ser. No. 10/826,773 entitled SYSTEM FOR REDUCING THE NUMBER OF PROGRAMS NECESSARY TO RENDER AN IMAGE, filed Apr. 16, 2004 by John Harper;

U.S. patent application Ser. No. 10/875,483 entitled FAST APPROXIMATION FUNCTIONS FOR IMAGE PROCESSING FILTERS, filed Jun. 24, 2004 by Ali Sazegari et al.;

U.S. patent application Ser. No. 11/021,358 entitled MANIPULATING TEXT AND GRAPHIC APPEARANCE, filed Dec. 23, 2004 by Mark Zimmer and Kok Chen;

U.S. patent application Ser. No. 11/113,656 entitled BAYER RECONSTRUCTION OF IMAGES USING A GPU, filed Apr. 25, 2005 by Ralph Brunner et al.;

U.S. patent application Ser. No. 11/113,658 entitled MULTI-CONIC GRADIENT GENERATION, filed Apr. 25, 2005 by Mark Zimmer and Ralph Brunner;

U.S. patent application Ser. No. 11/251,215 entitled ALGORITHMIC DESKTOP PICTURES, filed Oct. 14, 2005 by Mark Zimmer;

U.S. patent application Ser. No. 11/261,240 entitled EFFICIENT AND CORRECT SAMPLING OF ENCODED VIDEO, filed Oct. 27, 2005 by Jim Batson and Sean Gies;

U.S. patent application Ser. No. 11/261,382 entitled RESAMPLING OF VIDEO TO CORRECT FOR VIDEO EMITTER LOCATIONS, filed Oct. 27, 2005 by Jim Batson and Sean Gies; and U.S. patent application Ser. No. 11/095,013 entitled ENCODING A TRANSPARENCY (ALPHA) CHANNEL IN A VIDEO BITSTREAM, filed Mar. 31, 2005 by Barin Geoffry Haskell and David William Singer.

BACKGROUND OF THE INVENTION

Over the past several years there have been increasing demands placed upon graphics subsystems in all variety of hardware. For example, in the general computing area, even traditionally mundane programs, like presentation software, are including animation and other tools that are requiring faster and more complex graphics computation. In addition, the traditional graphics-intense applications like video, photo editing and gaming are growing both in scope and graphics-intensity. Moreover, vertical systems such as gaming and graphics dedicated computing (e.g. Nintendo Gamecube etc.) have accelerated even faster driving competition with the general computing architecture for graphics supremacy.

During this same time period, hardware manufacturers have sought to meet and exceed the growing demand with dedicated graphics processors having ever-increasing capability. Right now, there are several commercially available graphics processing units (GPUs) that are programmable. Programmable GPUs run programs that are generally called fragment programs. The name "fragment" program derives from the fact that the unit of data being operated upon is generally a pixel—i.e. a fragment of an image. The GPUs can run a fragment program on several pixels simultaneously to create a result, which is generally referred to by the name of the buffer in which it resides. GPUs use data input generally called textures, which is analogous to a collection of pixels.

While both programmable and non-programmable GPUs offer enhanced speed for graphics calculations, programmable GPUs differ in that they offer a high measure of flexibility. For example, prior to programmable GPUs, an application programmer might decide between using CPU time to render a more interesting graphic or using the GPU to increase overall application performance at the cost of displaying a less ideal graphic. Programmable GPUs have combined the speed advantage of prior GPUs with a significant measure of flexibility. In practical terms, programmability is an important advantage because it allows programs to use the graphics chip in ways similar to the system microprocessor. By using the GPU this way, the system can generate virtually infinite graphics effects without loading the system CPU. At the same time, as computers migrated toward more visually rich content, more applications required the complex manipulation of graphics.

The increasing flexibility of programmable GPUs coupled with increased demand for a higher level of graphics hardware controllability spurred the development of programming interfaces for the complex manipulation of images. Such programming interfaces include, for example, Open Graphics Library ("OpenGL") and Core Image. OpenGL is a specification defining a cross-language cross-platform API for writing applications that produce two-dimensional and three-dimensional computer graphics. The interface consists of over 250 different function calls which can be used to draw complex three-dimensional scenes from simple primitives. OpenGL is widely used in CAD, virtual reality, scientific visualisation, information visualisation and video game development.

Aspects of the present invention utilize aspects of U.S. patent application Ser. No. 10/826,762, entitled "High-Level Program Interface for Graphics Operations," which is incorporated by reference in its entirety, and generally referred to in this application as Core Image. Core Image is a higher level interface to a graphics subsystem which provides an abstraction layer that hides the complexity of graphics hardware while making available this abstraction layer to all applications. Core Image allows a programmer or program to quickly and efficiently apply a filter or effect to a given image. Furthermore, Core Image minimizes the use of memory and computation time, while efficiently dividing work between the CPU and GPU.

Digital imagery is becoming the backbone of many industries, including scientific visualization, photography, visual effects, and post production. The widespread use of digital imagery has resulted in end users who are not programmers requiring the ability to flexibly manipulate digital images. As the complexity of GPUs increases and as more non-programmer end users require the ability to edit multimedia, the ease with which a user can access these programming interfaces and otherwise utilize programmable GPUs gains importance.

While the powerful Core Image framework provides an optimal environment for both expressing and executing image effects, this may require that a developer write code that chains those filters together by creating the connections or create programmatically a CIFilterGraph that expresses a chain of filters.

It is desirable that non-programmer end users be able to easily edit multimedia using a scripting language. This editing may be carried out by leveraging the Core Image framework or any similar framework that may now exist or that will exist in the future (e.g., even OpenGL). A scripting language is a high-level programming language for connecting diverse pre-existing components to accomplish a new related task. Scripting languages typically allow their source codes to be loaded directly. This source code, or script, is evaluated at runtime, either by, most often, interpreting the script with an interpreter program or, less frequently, by compiling the script on-the-fly and executing the compiled script. Conventional scripting languages typically do not expose image editing features and are neither lightweight on the implementation side in the application nor are they easily understood by non-software-engineering users. It is desirable that a scripting language would be lightweight, easy to use by non-programmers, and capable of applying one or more filters to any available image.

Although Photoshop macros are capable of providing different filter parameters for different output media, Photoshop ties these macros to proprietary software which is limited due to lack of hardware acceleration, an expensive application package, and lack of portability to other applications. It is desirable that a scripting language would be able to edit multimedia from any application.

Microsoft's Windows Presentation Foundation coupled with Microsoft Expression Interactive Designer allows the creation of user interface elements that carry display, rendering, and interactivity attributes. These effects are expressed using the Extensible Application markup Language (XAML). XAML is a declarative XML-based language optimized for describing graphically rich visual user interfaces, such as those created by Macromedia Flash. However, these attributes are limited to basic elements like gradients, solid fills, and strokes, and lack the broad editing capacity demanded by non-programmers in image-enhancement intensive environments.

XML User Interface Language (XUL) and User Interface Markup Language (UIML) are other examples of XML-based user interface languages that also lack broad editing capacity. Scalable Vector Graphics (SVG) is another language supporting 2D graphics and scripted behavior which could be used as an XML-based user interface language, but it is designed primarily for web page implementation instead of robust system-level image manipulation.

Another problem is that there is nothing available that allows the user to attach his manipulations to the original image so that the original data remains untouched. Today's image formats are static, so that fixed results are expressed solely on the pixels. Therefore they don't allow the editing of any of the applied manipulations. On the other hand, a programatic recipe would allow the user to edit or virtually edit the image and its manipulations based on its original data without the loss of any of its dynamics due to rendering into a pixel format.

SUMMARY OF THE INVENTION

Among other advances, the invention seeks to solve the problems and meet the needs and desires described above. In doing so, some embodiments of the invention include methods, systems, and computer program products for multimedia scripting, namely editing digital multimedia files and digital multimedia presentation using a scripting language. In preferred embodiments, the scripting language is human-readable, which facilitates scripting by non-programmers. Mulitmedia may include audio, video images, or still images or operations thereon. In some embodiments, multimedia scripting may also include effecting a disposition of an image or other multimedia, such as, for example, to a file system or to an email attachment.

In a more specific embodiment of this type, a high-level program interface includes graphics filtering functions for editing digital images that are capable of being invoked by the use of a scripting language. In some embodiments, the user exploits a high-level program interface by creating effects or specifying filter functions from a pre-defined list by using the scripting language. The scripting language may be capable of adding filters to the pre-defined list. Scripting may also be used to make a Core Image graph, as described in more detail below. Alternatively, a Core Image graph may be parsed to define a user-level script which could be used to recreate the Core Image graph. Other embodiments include a graphical user interface ("GUI") for script creation. This GUI may be adapted for user-level script creation or for developer script creation.

In one embodiment of the invention, a human-readable scripting language, upon being interpreted, will invoke software exploiting a selected processor in the system to compose a graph-like description of an image task. Invocation of this software may be carried out by calling from an interface to external native modules written in a traditional compiled language. Invocation of the software may alternatively be carried out by sending a message from an interface to external native modules written in a traditional compiled language. Core Image may include an API and an efficient processing infrastructure for deployment in a multi-processor system. The graph-like description may be a node and link representation of an image, where nodes may represent operators and links may represent intermediary results and the storage necessary to hold those results. In greater particularity, nodes in the graph-like description may ultimately comprise threads or programs for computing a portion of the overall image operation on another processor. Furthermore, having a graph-like description of the overall image task allows use of an optimizing compiler to reduce the necessary resources for the overall image task. This compiling function is especially useful since the node programs will generally run on a processor other than that which runs the compiler.

The scripting language used to invoke image processing software such as Core Image and audio processing software such as Core Audio is referred to in this specification as the Core Image Scripting Language ("CISL"). The term "CISL" is also used in this specification to refer to the scripts written in such a scripting language, the software interpreting such a scripting language and invoking Core Image and Core Audio as described immediately above, and any interface adapted for CISL instructions. Although Core Image and Core Audio are used as examples, CISL may be used with other image processing software or audio processing software, and is not confined to these specific examples, which are provided merely for illustration. CISL software may be contained in one or more CISL modules separate from Core Image and Core Audio, or it may be embedded in a Core Image or Core Audio module. Differing embodiments of the invention may exploit either or both of the language or the software as a definition of CISL. The specific meaning derives easily from the contextual use.

The forgoing general embodiment may be described in the context of a contemporary pairing of a single CPU with a single GPU. This embodiment proposes software running on the CPU for providing a user-iterface, assessing the overall image task, and constructing a graph-like description of this image task. This may be visually represented as a tree graph of nodes and links with associations as described above. Since the node-programs may execute on the GPU, the construction of the program accounts for properties of the GPU. Most notably, and in a general sense, programmable GPUs operate several parallel execution streams so the node-programs may be expressed in parallelizable languages. For example, node programs may be GPU fragment programs. After construction of the graph representing the overall image task, the graph may be optimized by virtue of a compiler running on the CPU. Alternatively, the graph may be optimized by a compiler in distinct pieces, as the graph is created. The purpose of optimizing is to minimize memory usage and CPU or GPU time or otherwise gain efficiency when the image is computed.

According to varying embodiments of the invention, optimization may have many functional characteristics. For example, optimization may include caching intermediary results, consolidating multiple fragment programs into one, limiting memory and computation to areas within a confined domain of definition and region of interest, or optimizing division of computation between processors.

Applying these techniques in the contemporary graphics context is highly efficient and allows developers to write filters by expressing the operations to be performed on an element (e.g. pixel) or elements without concern for the specific hardware in a system—that will be accounted by the compiler. In addition, having created a scripting language, an API, and efficient processing infrastructure for deployment in a multi-processor system, many embodiments also include functionality to exploit the scripting language on single processor systems. In a very general sense, this is accomplished by emulation.

BRIEF DESCRIPTION OF THE DRAWINGS

FIG. 7(a) and 7(b) are illustrations of using multiple processors to apply multiple effects.
FIG. 7(c) an illustration of using multiple processors to apply multiple effects
FIG. 8 sets forth a flowchart illustrating aspects of the CISL software suite according to embodiments of the present disclosure, including manipulating items by invoking graphics filtering functions from Core Image according to CISL script instructions.

DETAILED DESCRIPTION

As described above, in one embodiment of the invention, interpreting a script results in calls from an interface to external native modules exploiting a selected processor in the system to compose a graph-like description of an image task. Although aspects of the invention are disclosed throughout this specification describing invocation of external functions as a software module or object calling a method in an external module or object, it is to be understood that invocation by an object sending a message to a second object, whereupon the second object responds, is also well within the intended meaning of invocation as described in the present disclosure. The external native modules include image processing aspects of the invention referred to generally as Core Image. Core Image, which may include an API and an efficient processing infrastructure for deployment in a multi-processor system, is explained immediately below. Scripting aspects of the invention, referred to generally as CISL, are discussed in greater detail further below in the specification.

A. Technology and Nomenclature

1. Technology

The inventive embodiments described herein may have implication and use in all types of multi-processor computing systems and, in particular, where differing types of processors are exploited in a system. Most of the discussion herein focuses on a common computing configuration having a CPU resource and a GPU resource. The discussion is only for illustration and not intended to confine the application of the invention to other systems having either: no GPU, multiple CPUs and one GPU, multiple GPUs and one CPU or multiple GPUs and multiple CPUs. With that caveat, we shall provide information regarding a typical hardware and software operating environment.

Figure 1:
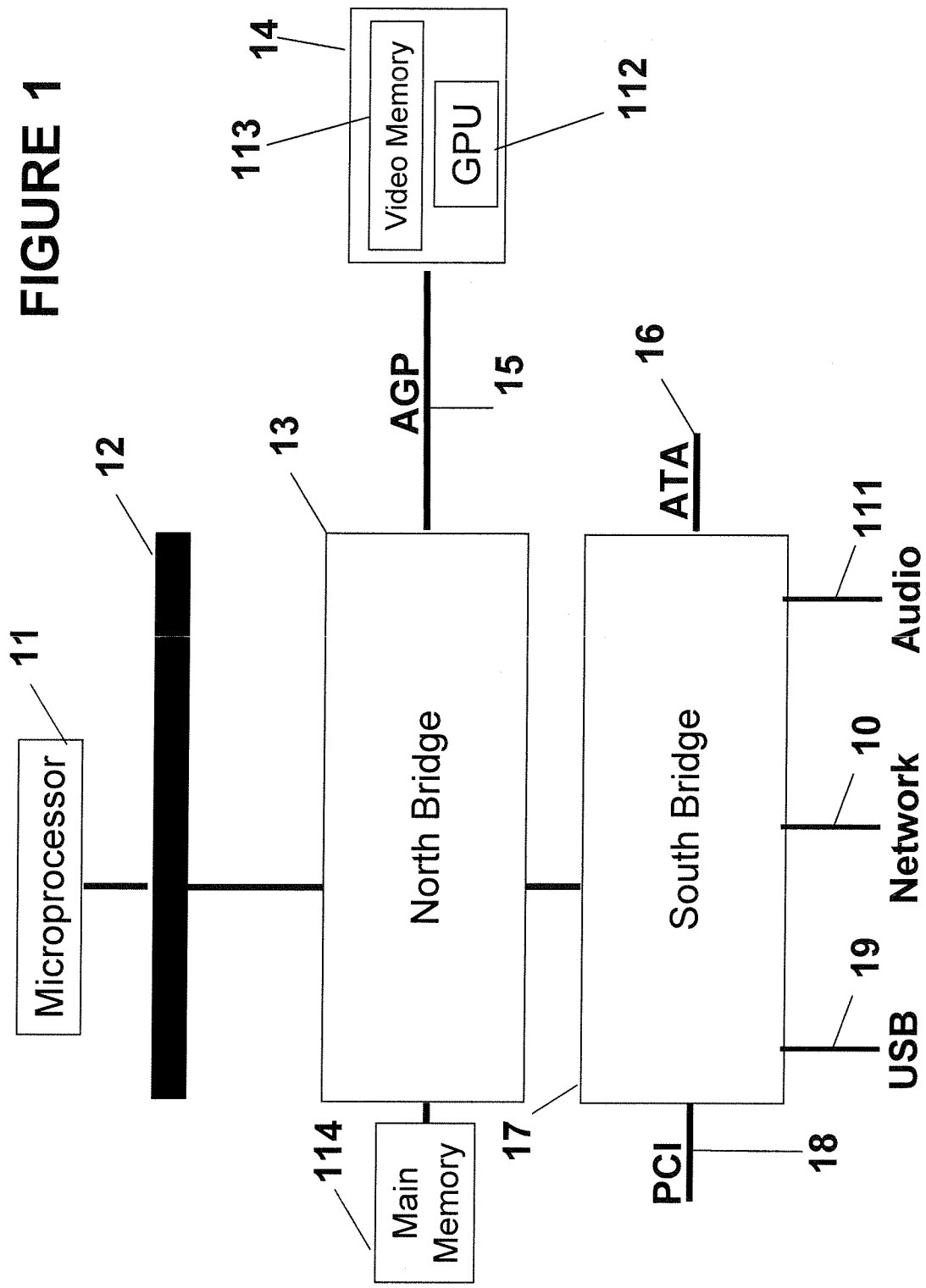
FIG. 1 is a sample hardware configuration.
Figure 2A:
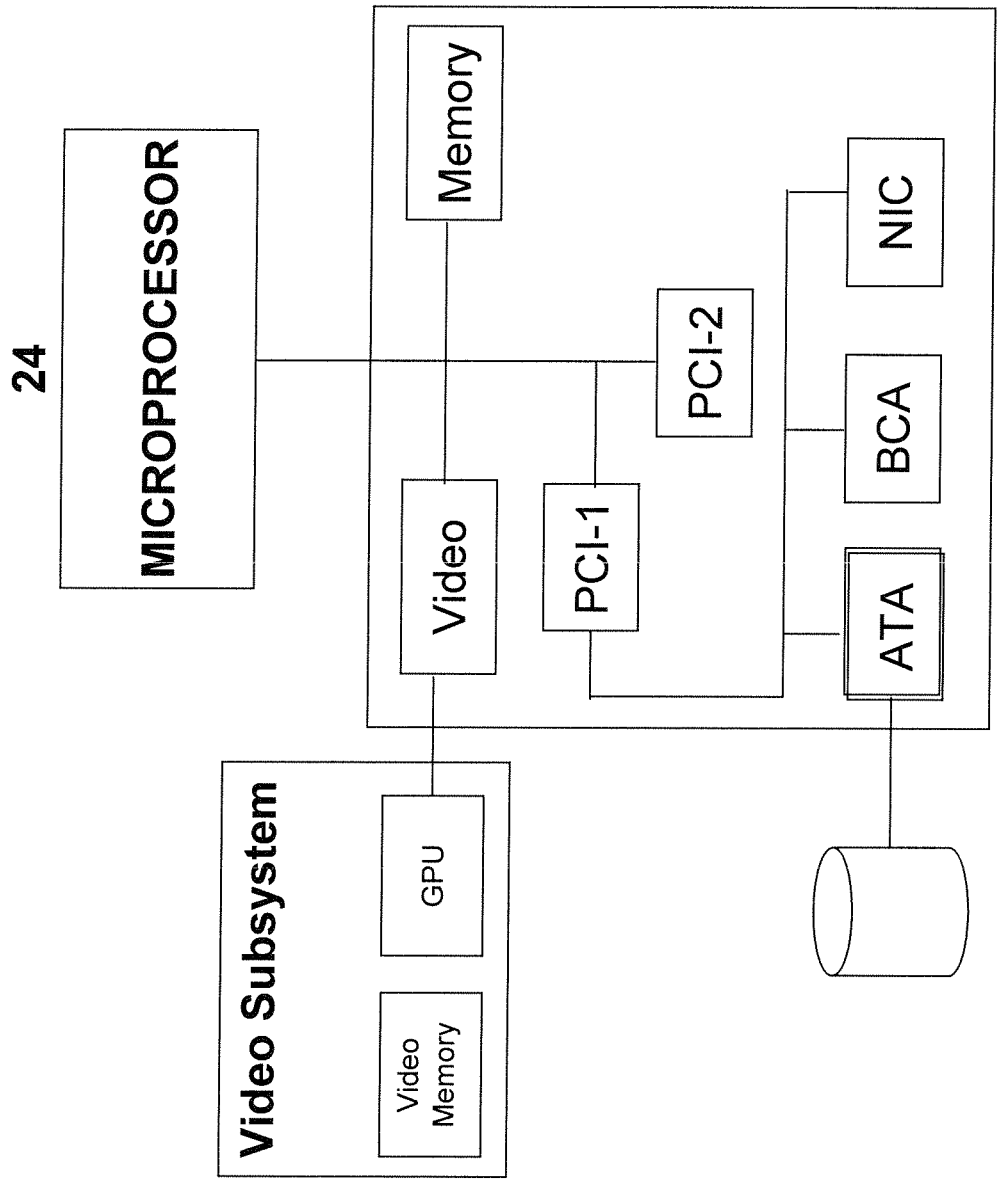
FIGS. 2(a) and 2(b) are samples of hardware configuration.
Figure 2B:
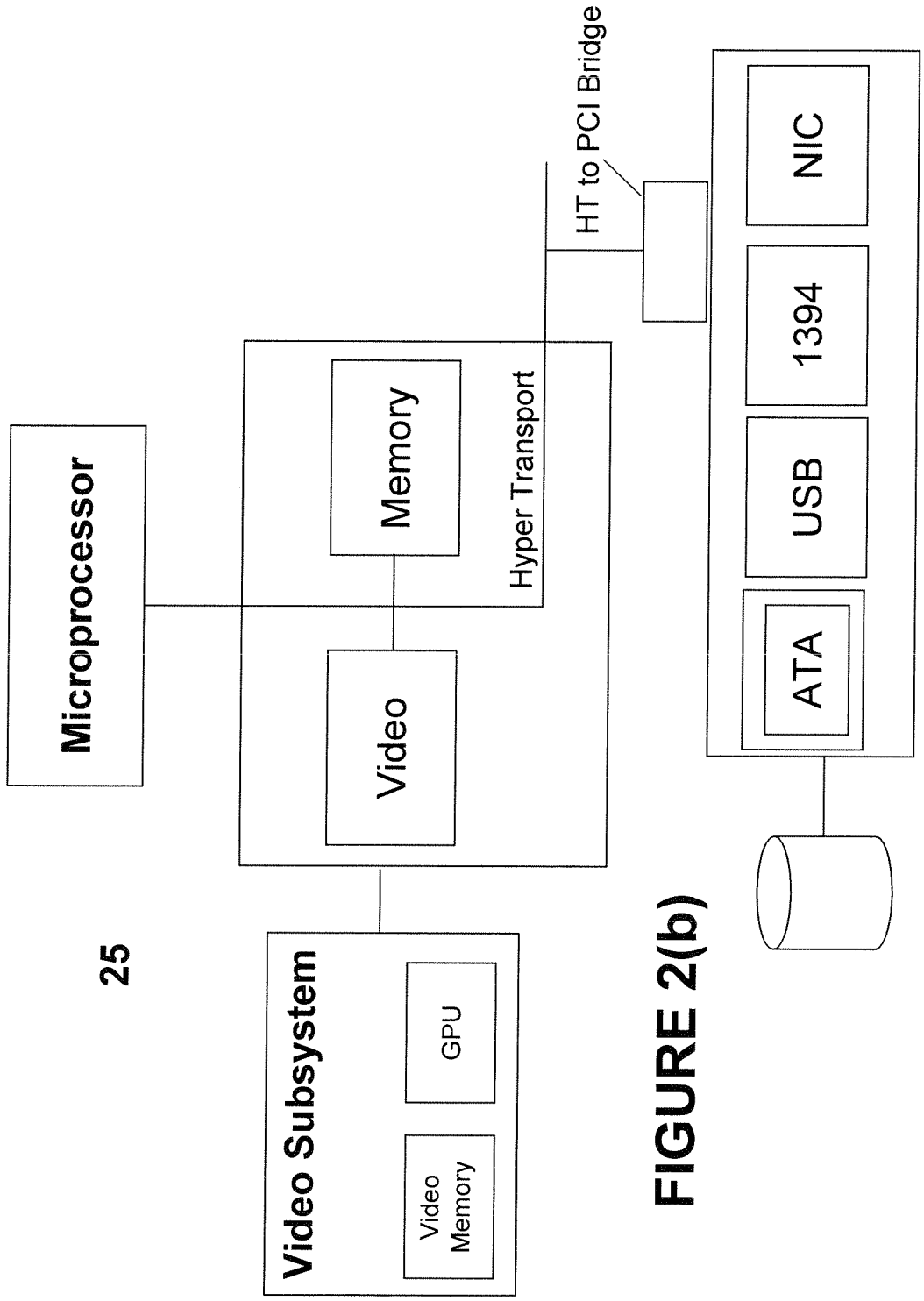

Referring to FIG. 1, a common hardware computing configuration is shown. Very generally, a Microprocessor 11 is coupled to chipset support integrated circuits 13 and 17. The microprocessor may be any microprocessor or controller such as one of the Intel Pentium family or IBM/Motorola PowerPC chips such as the 23, 24 or 25. The chipset ICs (expressed here as North Bridge 13 and South Bridge 17) may be implemented in one or more ICs. The chipset 13, 17 generally couples to the microprocessor through a bus 12 or by direct links, which are well known in the art at this time. If the chipset 13, 17 is implemented in more than one IC, it is common for North Bridge functionality (AGP, memory management etc) to have a more direct connection to the processor by either connection to a common bus or the aforementioned links. A separate chip containing the South Bridge functionality is very commonly coupled to the microprocessor 11 through the North Bridge. However, we do not wish to preclude other configurations that exist now or may exist in the future. Some potential South Bridge functionality includes an ATA bus 16 for peripheral attachments such as disk drives; a PCI bus 18 for attachment of all manner of peripherals; a USB controller 19 for attachment of USB devices; a network interface controller 110 for supporting Ethernet or potentially other networks; and audio support 111. More relevantly, typical North Bridge functionality includes a memory controller to support main memory 114 and an accelerated graphics port 15 for support of a video subsystem. Memory is typically any of a variety of types of dynamic random access memory, but may also, in alternative configurations be static RAM, magnetic memory, optical memory or any other suitable storage medium that exists or may exist in the future. AGP 15 is a special port placed in the chipset so that the graphics subsystem has rapid access to the system resources such as the microprocessor and main memory. There are various emerging flavors of AGP and certainly other methods to accelerate the speed of interaction between core resources and the graphics subsystem. This discussion is not intended to limit use to any particular method for performing similar functions. Lastly, FIG. 2 shows alternative computing hardware configurations 24 and 25, which are intended for loose association with 24 and 25 microprocessors respectively.

Figure 3:
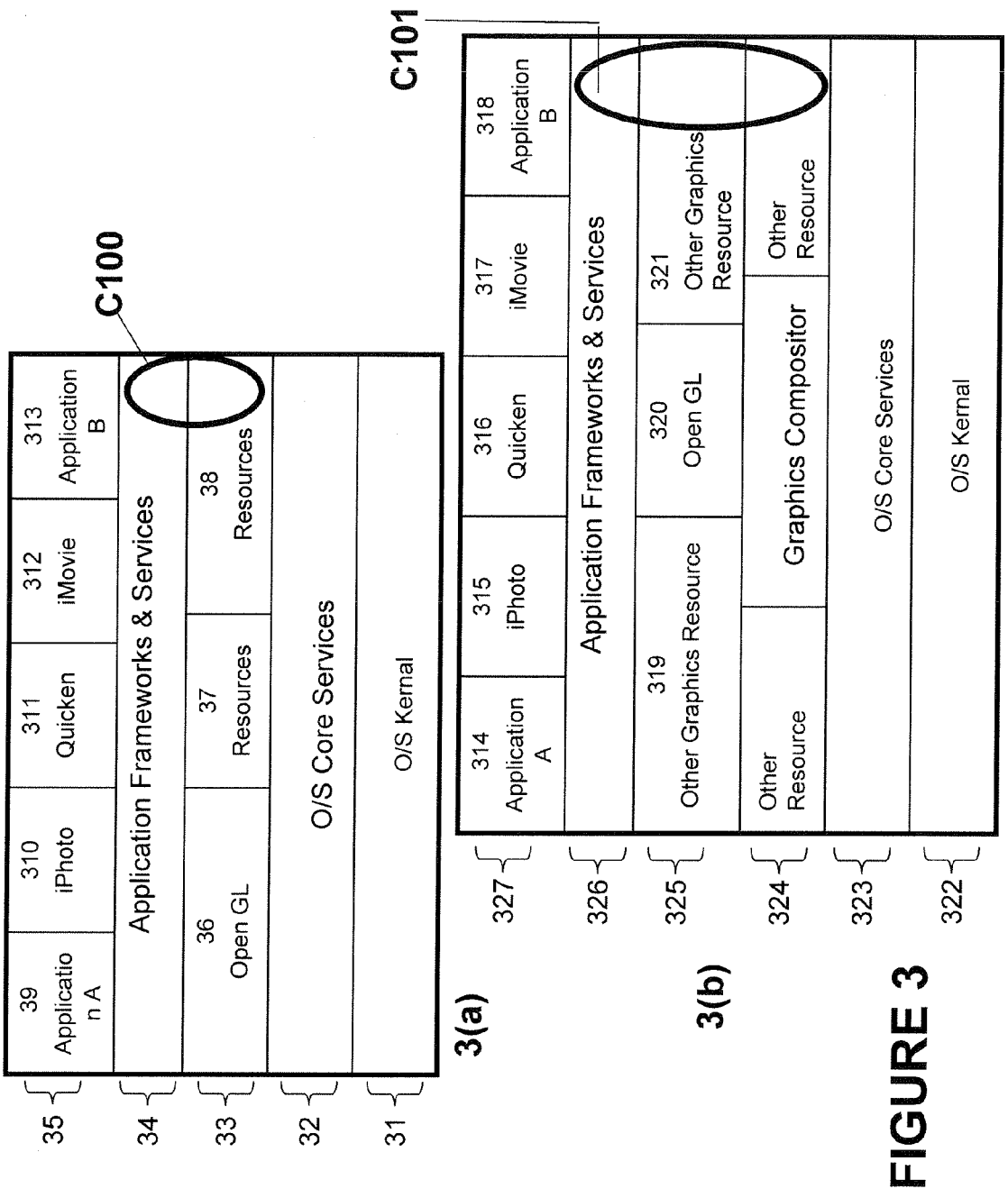
FIGS. 3(a) and 3(b) are an illustrative of software stack.

As noted above, embodiments of the inventions disclosed herein include software. As such, we shall provide a description of common computing software architecture as expressed in layer diagrams of FIG. 3. Like our hardware examples, these are not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in a layer use resources from the layers below and provide services to layers above. However, in practice, all components of a particular software element may not behave entirely in that manner.

With those caveats regarding software, referring to FIG. 3(a), layer 31 is the O/S kernel, which provides core O/S functions in a highly protected environment Above the O/S kernel, there is layer 32 O/S core services, which extend functional services to the layers above such as disk and communications access. Layer 33 is inserted here to show the general relative positioning of the OpenGL library and similar resources. Layer 34 is an amalgamation of functions typically expressed as two layers: applications frameworks and application services. For purposes of our discussion, both these layers provide high-level and often functional support for application programs which reside in the highest layer shown here 35. Item C100 is intended to show the relative positioning of Core Image, a software suite and moniker, which provides a vehicle for describing aspects of the current invention. In some embodiments, CISL resides in one or more modules adjacent to Core Image in one or more layers. Alternatively, some aspects of CISL may be embedded in Core Image. Furthermore, one skilled in the art will recognize that GUI aspects may be embodied in application layer 35.

Referring now to 3(b), item C101 represents the relative positioning of the Core Image suite. It is evident in the diagram 3(b) that, by comparison to 3(a), a layer has been added 324 for another graphics function—compositing. It is the compositor's job to perform window composition and management in a windowing system, like that which is discussed for many embodiments.

2. Trees and Graphs

Figure 4:
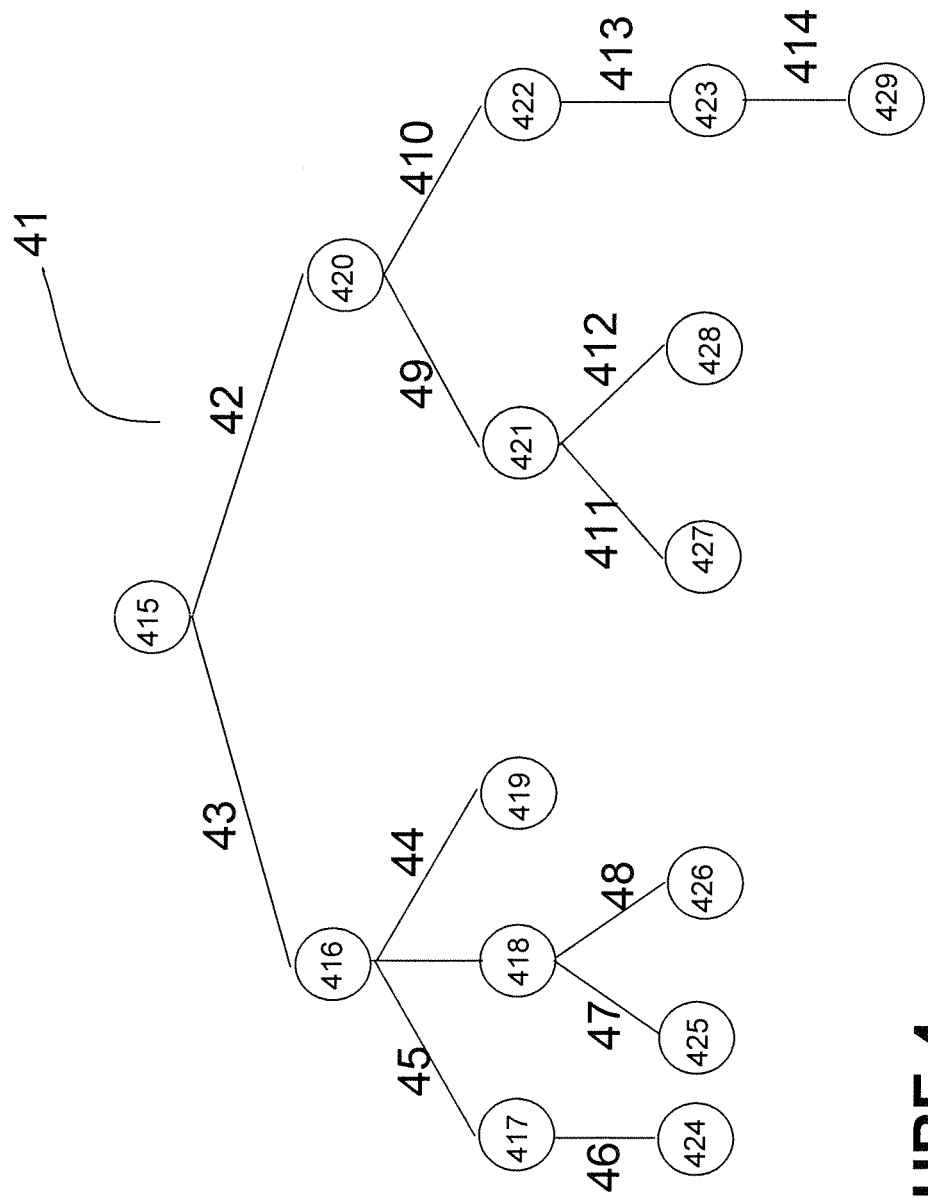
FIG. 4 is a graph.

In mathematics and other computational sciences, problems may be expressed in a parsed fashion, which lends itself to machine-performed computation and the programming of such a machine. An example of parsed expression is a generalized tree structure such as that shown in FIG. 4. Referring to FIG. 4, tree structure 41 is comprised of: links, which represent the result of the nearest subservient node (42, 43, 44, 45, 46, 47, 48, 49, 410, 411, 412, 413 and 414); and two types of nodes. There are leaf nodes that represent pre-existing computational input (e.g. operands), 419, 424, 425, 426, 427, 428 and 429. Alternatively, there are functional nodes that represent computational functions (e.g. operators) 415, 416, 417, 418, 420, 421, 422 and 423. As an overall example, referring to FIG. 4, link 46 serves as an input to functional node 417 and represents the result of leaf node 424 (the result of a leaf node, simply being the leaf).

Figure 5:
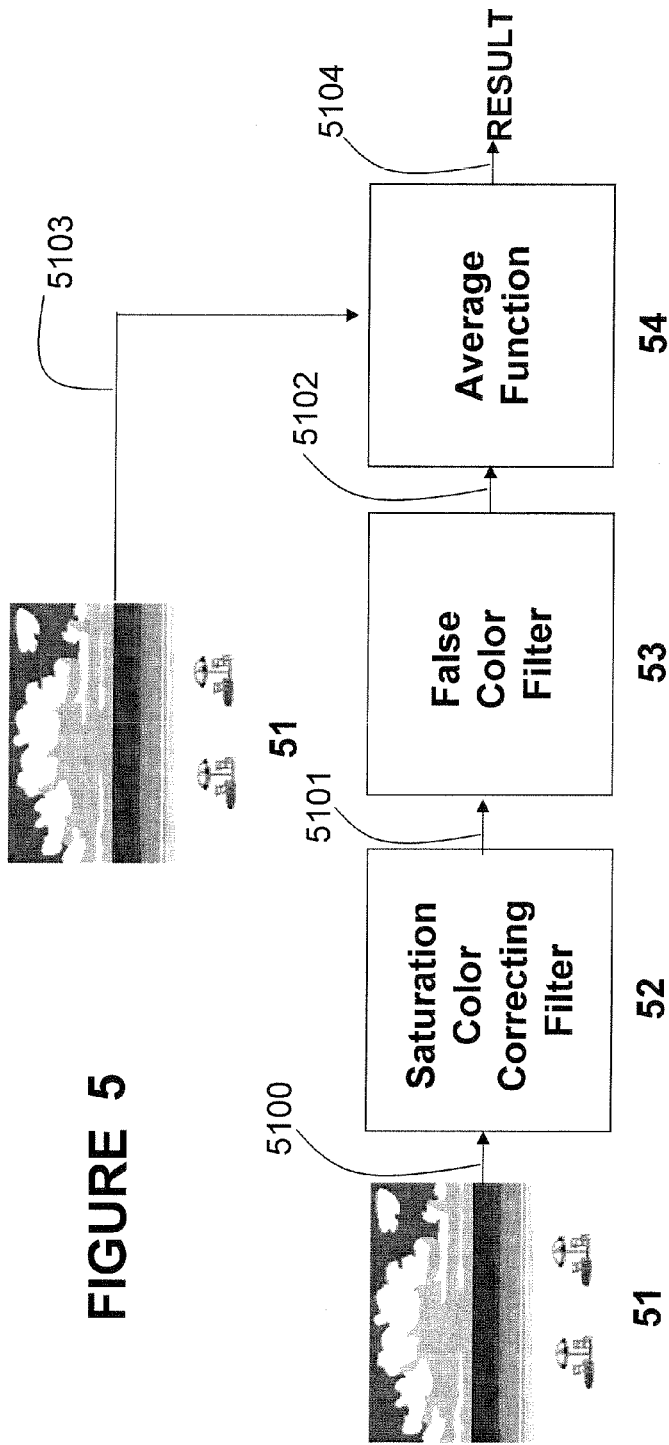
FIG. 5 is a graph and sample program steps.

Referring now to FIG. 5, another tree is shown using rectangular nodes rather than circles. However, the representative nature of the diagram is the same: leaf nodes 51 are analogous to operands; functional nodes 52, 53, and 54 represent operators, and the links 5100, 5101, 5102, 5103 and 5104 represent results.

At various places in this disclosure we use trees like those in FIGS. 4 and 5, and we discuss those trees in the context of "graphs" being used or assembled within a computer system. We generally do not intend to imply that the computer system is constructing or using the graphical tree that is pictured, but rather that the system makes, maintains or uses some representation of the graphical tree that we draw for human illustrative purposes.

Furthermore, we generally use the trees (or graphs) in the context of discussing graphics technology and software. From the perspective of an application program or programmer, an image that is defined by a tree or graph is usually indistinguishable from an image defined by an array of pixels. Both types of images define the same ultimate object and it is the object that the application program associates with the image. In some respects, the same is true regarding the perspective of Core Image (or other software embodying the inventions herein). Therefore, Core Image may evaluate an image calculation task by evaluating a graph. In that respect, the result of the root node of the graph is the ultimate result. Referring to FIGS. 4 and 5, nodes 415 and 54 are the respective root nodes of the graphs.

In describing the embodiments of the invention and Core Image, we frequently reference these illustrative tools. Therefore, by way of introduction regarding many of the embodiments discussed herein, referring to FIG. 4, the following associations are generally appropriate in the context of our discussion: (i) the tree shown is generally referred to a low-level graph; (ii) functional nodes 415, 416, 417, 418, 420, 421, 422 and 423 represent "kernels" or fragment programs that run on a microprocessor such as a GPU; (iii) leaf nodes 419, 424, 425, 426, 427, 428 and 429 generally represent images, which is to say a collection of pixels or a representation of same; and (iv) links 42, 43, 44, 45, 46, 47, 48, 49, 410, 411, 412, 413 and 414 represent results, although in the context of an operation that will actually occur, those results are usually associated with a buffer for storing same.

In addition, for introduction purposes regarding many of the embodiments discussed herein, referring to FIG. 5, the following associations are appropriate in the context of our discussion: (i) the tree shown is generally referred to as a high-level graph; leaf nodes 51 represent images; functional nodes 52, 53, and 54 represent high-level filters, which are typically pre-defined filters; and the links 5100, 5101, 5102, 5103 and 5104 represent results of the filter, but unlike the low-level graph, are not necessarily associated with buffers.

B. Core Image API from the Programmer Perspective

Many embodiments of the invention involve object oriented programming with four types of objects. These object types are images; filters, context, and vectors. Each is discussed briefly and with an effort not to limit its generality.

Images are either the two dimensional result of rendering (a pixel image) or a representation of the same. In high-level program operations, we often maintain objects that represent images in that those objects require computation to become the actual pixel values. Differing embodiments of the invention may exploit either or both of pixel-value images and un-computed images as a definition of image. The specific meaning derives quite easily from the contextual use (having no relation to the "context" object). In a general sense, during discussions relating to filters, images should be interpreted as inputs to a function or filter.

Filters are high-level functions that are used to affect images. Filters may comprise one or more of the pre-defined filters listed at the end of this disclosure. Filters may be analogized to fragment programs, which similarly affect images (or more precisely, typically textures), however producing only one pixel at a time. In many of the inventive embodiments, Core Image compiles filter-based image manipulation so that such manipulation can occur on a GPU using fragment programs. There is not necessarily a one-to-one correspondence between filters and fragment programs.

Context is a space such as a defined place in memory in which the result of a filtering operation resides. If images are assumed to be inputs as suggested above, then context is assumed to be output.

A Vector is a collection of floating point numbers. For most embodiments discussed herein, Vectors are associated with four floating point numbers, each number having the same fixed number of bits—commonly 32. In graphics, vectors may be employed to represent (i) the four dimensions required to describe pixel appearance (R (red); G (green); B (blue); and Alpha (transparency)); or (ii) the two or three dimensions required to describe two-space, three-space, or four-space (homogeneous) coordinates respectively: X, Y, Z, and W.

C. Core Image and the Core Image API

Core Image is a software suite comprising many routines and functioning as, among other things, a high-level programming language or API built for graphics functions but applicable to other functionality such as math alone (e.g. convolution operations). Recall that we use the moniker Core Image to refer to any one embodiment or any group of embodiments and we do not intend to confine the invention to any particular comment regarding "Core Image." Similarly, we may refer to a routine or process as within Core Image and by that, we do not intend to imply this such software is implemented as a single unit or layer.

Core Image includes a high-level language or API for communicating with a graphics framework and graphics-focused applications services suite. This also includes a compiler for producing assembly from the high-level language. The language/API is platform and hardware independent because the graphics framework and subservient software layers may account for platform or hardware differences. The API allows programmers to apply effects to images without concern for (1) the states and other parameters required by OpenGL or like interfaces, or (2) assembly language for the GPU or other resource performing graphics rendering.

When conceptualized as software, Core Image (or an embodiment of the API and associated compiler) may be viewed as a suite of graphics services routines positioned generally between application programs and the operating systems. Since layered software conceptualizations are subject to varying interpretations, this discussion is not intended to be exclusive of other ways to conceptualize the layered position of Core Image (or any graphics services software suite according to an embodiment of the invention). With that caveat, referring to FIGS. 3(a) and 3(b), graphics services software suites C100 and C101 are respectively shown.

The positioning of these graphic services C100 and C101 implies that these suites may include components for application frameworks, application services and graphics resources. In short, the intention in this positioning is to imply that Core Image C100 and C101 may interact with: Applications in layers 35 and 327; other frameworks or services in layers 34 and 326; resources such as OpenGL in layers 33 and 325; the compositor in layer 24; and O/S services in layers 32 and 323.

In a general sense, as applied to graphics, Core Image allows programmers and programs to implement an effect by either (1) using a pre-defined high-level filter or (2) by assembling a series of pre-defined filters using the API or one or more other embodiments of this invention. In the latter case, the programmer or program makes API calls to Core Image for high-level descriptions of zero or more of the pre-defined filters. In aspects of the present disclosure, aspects of a scripting language software suite interpreting a CISL script make these API calls to Core Image. In other aspects of the present disclosure, aspects of a scripting language software suite interpreting a CISL script may make calls to external native modules written in a traditional compiled language separate from the Core Image API. The invocation of Core Image is discussed in further detail with reference to the "CISL" section of the specification below.

The program or programmer places the high-level descriptions (or reference thereto) in a data structure that we shall call a high-level graph. The high-level graph is assembled by the programmer or program creating a new filter. The high-level graph defines relationships between the pre-defined filters and images being employed in the new filter. When the programmer or program has completed building its high-level graph, it has effectively completed its tasks for creating the new filter. That is to say that all the information necessary to create the new filter is embodied in the high-level graph.

In an alternative embodiment, as a programmer or program assembles a graph in cooperation with Core Image, the graph created may be a low-level graph or substantially a low-level graph. For example, from the perspective of the program or programmer, a request may be made for a high-level filter, however, Core Image may create and deliver an object that is a low-level filter or some interim step between a low-level filter and a high-level filter. Since the program or programmer does not actually inspect the object, Core Image can respond to requests for high-level code with low-level code. In this manner, Core Image may assemble a low-level graph while a program believes to be working with high-level filters and objects.

Core Image has the additional tasks of ultimately optimizing and compiling the high-level graph (along with any applicable input parameters) to yield a GPU-ready program. The compiling step may be performed just in time for use of the ultimate image. In summary, an interpreter program interpreting a CISL script invokes the Core Image software suite—using the high-level language of the API (including available filters) or other means—to create an effect, which is essentially a new filter comprised of various other filters and inputs. The program may also programmatically apply this filter to an image. Various embodiments of the invention contemplate various divisions of work between the GPU and CPU. Generally, the CPU will run Core Image and the GPU will run the ultimate product of Core Image. However, depending upon hardware abilities and ultimate optimizations, Core Image may create tasks for the CPU and GPU. Furthermore, if there is no programmable GPU in the system, Core Image may create an object for the CPU to render the image to context.

D. Basic Functions of a Core Image Embodiment

Looking now more fully at the capabilities of Core Image, in one embodiment, the API provides six high-level functions for the programmer and ultimately a user of an application program: creation of a context; creation of an image; creation of a filter; the ability to set parameters associated with filters (e.g. the arguments of a filter function); the ability to ask for the output of a filter or group of filters that has been assembled; and the ability to render an image to a context.

1. Creating a Context.

We refer generally to an output as a context, so the ability to create a context is derived from tools that allow definition of an object in memory. The definition of such an object is necessary so that there may be a destination for the results of an operation. For example, a context can be associated with a bitmap in main memory or with an OpenGL view. These associated image containers are used as a destination for rendering. While the invention primarily contemplates memory such as video memory associated with a system's graphics functions, the concepts discussed here apply equally to any memory or storage found elsewhere in the system or accessible to the system. Therefore, without limitation, memory may include all types of solid state memory such as dynamic memory or static memory whether specifically associated with the graphics subsystem, shared with the graphics subsystem or nominally dedicated to the main system or another subsystem accessible by the main system. Furthermore, while speed is certainly an issue, the concepts herein do not intend to exclude magnetic or optical memory.

As example of creating a context, we can assume that an application program wishes to ultimately display something to screen. Assume Apple's iPhoto application desires to display an image of the sea shore in response to a user command. iPhoto may exploit the Core Image API by calling a function to request creation of a context. Core Image will return, among other possible things, a handle of identification of the created context. Let's assume that handle is "empty context."

2. Creating an Image.

We refer generally to an input as an image, because coordinates or pixels in an image may be sampled to yield relevant values. Using an embodiment of the inventive API, images may be created from nothing or from another image. An image is created from nothing by providing a mechanism for creating pixel values. For example, an image may be created from nothing by simply defining the image as a color or a mathematical combination of colors (like a checkerboard or striped page). An image, more commonly, may be created from another image by applying one or more filters to the existing image.

Following our iPhoto example from above, iPhoto may create an image by asking graphic services to take an existing image of children on a sea shore and apply a filter (e.g. a blur) to some area outside of the children. Upon application of this filter, a new image is created. For clarity, this is an un-computed image in that new pixel values have not been calculated, but rather, the blur filter has been programmatically applied and resides or is referenced in the image buffer where all the other elements necessary to calculate the pixels are either stored or referenced.

3. Create a Filter.

We refer generally to a filter as any function that may be performed on zero or more images (ultimately a pixel). In slightly more particularity, a filter may be a function that accepts images and other parameters (associated with and dependent upon the particular filter) as inputs and yields a new image. The API currently provides several dozen filters that are listed and described elsewhere in this disclosure. However, an embodiment of the invention calls for an extensible nature so the inventors continue to develop filters and have provided an ability of others to develop filters as well. While the invention contemplates extensibility that allows for addition of pre-defined type filters, our discussion will focus on new filters created by the combination and manipulation of zero or more pre-defined filters.

One manner contemplated for the creation of a filter is for an interpreter program to begin by using an embodiment of the inventive API to tie together one or more of the API's pre-defined filters and any other items or functions that the programmer wishes to apply. As mentioned earlier, to create a new filter, the interpreter program may create a high-level graph comprising representations of all images and pre-defined filters that will be used and the relationship between those objects. In some embodiments, the pre-defined filters are intended to be as comprehensive as possible of rudimentary graphics functions, so as to minimize the need or incentive for the programmer or program to write assembly for the GPU. Indeed, an overall benefit of Core Image is the ability to program at the application layer without reference to the specific graphics hardware.

Once a new filter is defined with a high-level graph, an application program or user (at the CPU level) may call Core Image to implement the high-level graph (effect the filters referenced in the graph on the images referenced in the graph in a manner defined by the graph). Of course, the high-level graph may have been written to incorporate more than one image, but the technique is the same. When implementing the filter, Core Image may require other input data because filters commonly have filter-specific inputs such as a blur radius for blurs, geometric parameters or any other inputs like those specified in the filter definitions listed later.

An important function of Core Image is to then return one or more objects to the application program or user. According to varying embodiments of the invention the returned objects may be rendered or ready for computation on the GPU, the CPU or some combination of those two. In one alternative embodiment, Core Image builds all or part of the low-level graph while responding to application program requests for high-level elements. In this embodiment, the application program believes it is asking for higher level code, while Core Image is delivering lower-level code (the application program cannot detect the difference because it does not analyze the objects delivered by Core Image). Alternatively, in a preferred embodiment, the returned objects may be an optimized low-level graph ready for just-in-time compilation, when the application requires the image in a context. In some embodiments, Core Image will return only one object, which is to be compiled just-in-time and run on the GPU. In order to do so, Core Image must convert (and generally optimize) the high-level graph and convert the image(s) to a texture(s) (GPUs use textures, not images for computation). In converting an image to a texture, the Core Image uses the CPU to first convert the image to a sampler. A sampler is an image plus its state, so converting to a sampler comprises the steps of incorporating state information such as the following: (1) wrap mode such as transparent, clamp or replicate; (ii) interpolation mode such as using values from the nearest whole pixel to the subject pixel, or interpolating across a grid of four pixels surrounding the subject pixel; and (iii) affine transform such as rotate, scale, skew, translate, mirror. The sampler may then easily be converted to a texture for use by the GPU. With all this as input, the CPU, running Core Image, creates an object comprising a GPU program that, when executed, will implement the filter on actual pixels (provided by the textures created above).

Referring now to FIG. 5, we shall proceed through a general example of filter creation. Recalling back to our iPhoto sea shore example, a user may ask iPhoto to auto-enhance a photo. Assume, purely for illustration purposes that the auto enhance requires the following filter creation. This is purely for illustration in that the current iPhoto enhance feature would actually not operate in this way. iPhoto will first create its desired filter. This process might start by calling Core Image to allocate the base image 51, which at this point may be in graph or pixel form. We see this in step one of FIG. 5 and the high-level graph tree diagram. Next iPhoto calls Core Image to add a program step (and corresponding tree position) to apply color correction filter 52 to the image 51. We see this in FIG. 5 step 2 and the high-level graph tree diagram. Note that the output of step 2 in FIG. 5 is defined as Placeholder CC (for color corrected) sea shore. Since, at this point, it is uncertain when and if this intermediary result (CC sea shore) will ever exist, we do not allocate a buffer but rather place a placeholder in the high-level graph indicating the possibility of an intermediary result. In furtherance of the auto-enhance feature, iPhoto might further apply a false color filter 53 to the result of the 52 filtering. As before, iPhoto will call Core Image to get the high-level false color filter and insert same in the mounting high-level graph (and tree in FIG. 5 for illustration purposes). Next, in order to round out the auto enhance function, iPhoto might choose to average the result of the 53 filtering (FC CC sea shore) with the original sea shore image (51), so an appropriate filter 54 would be called from Core Image and inserted in high-level graph. This is seen both in the tree graph of FIG. 5 and the sample program steps.

Figure 6:
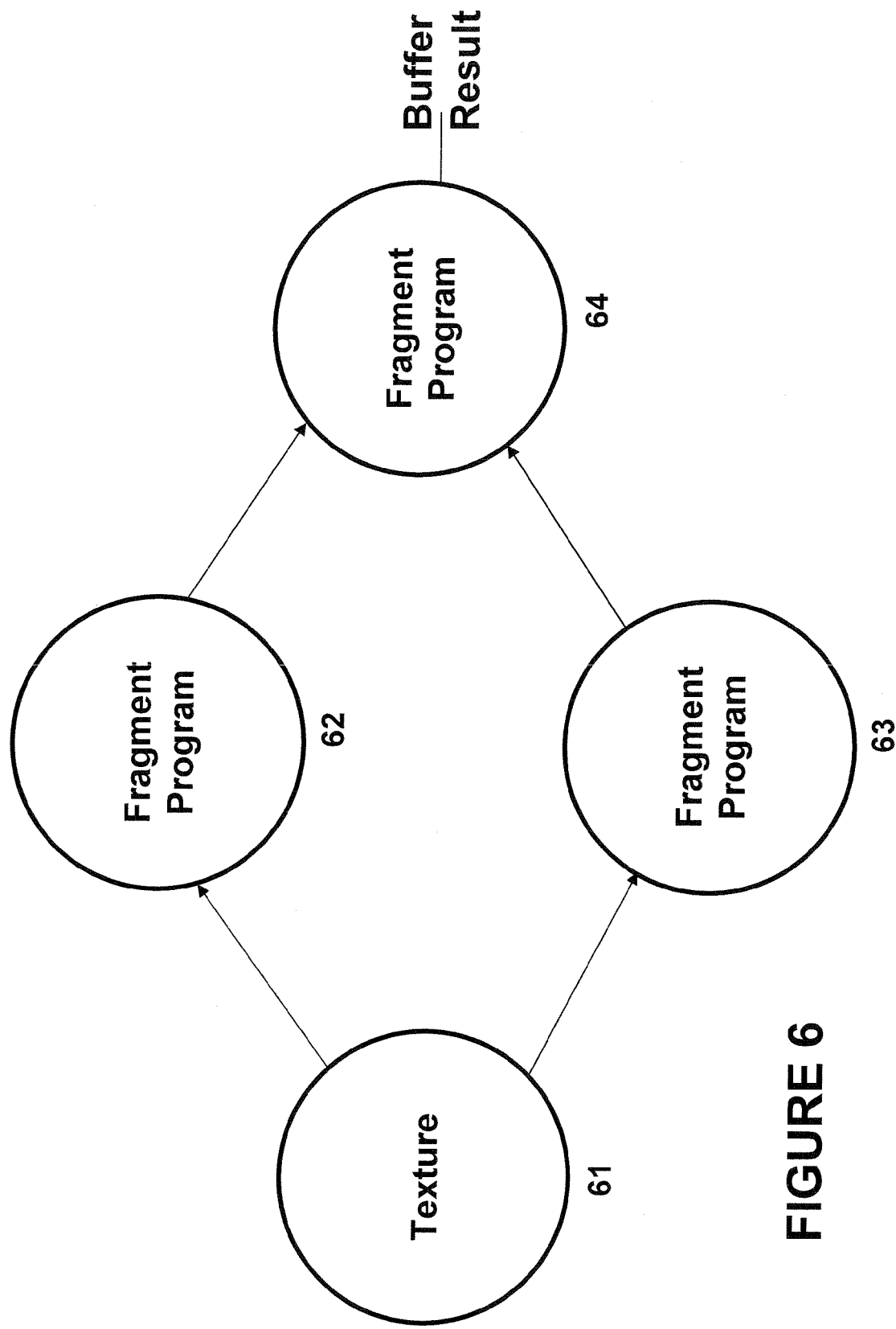
FIG. 6 is a graph.

In our example, iPhoto now has a high-level graph for its desired result of an auto enhance sea shore image. In order to make that result usable in accordance with the embodiment of this example, iPhoto may sequentially call routines in Core Image (or Core Image may act alone) to convert, optimize or compile the high-level program as described above. For illustrative purposes, a result expressed in a simple form (analogous to FIG. 5) is displayed in FIG. 6. We see in FIG. 6 that the fragment programs (62, 63 and 64) need not analogize well to the high-level pre-defined filters that comprise the high-level tree for auto enhance shown in FIG. 5. Each high-level filter may comprise one or more fragment programs to effect its purpose. Furthermore, when the program is optimized, it is possible for fragment programs to be replaced, re-ordered or eliminated. Lastly we see that the GPU implementation shown in FIG. 6 begins with a texture rather than an image, and ends by placing the result in a physical place (a buffer—no more place holders).

4. Set Values for a Filter.

As referenced earlier, each high-level filter, whether created as above or pre-defined as in the list herein, may have a set of input values that are necessary and defined by the filter function. In our sea shore example, we showed these input parameters as a vector "parameters (X,Y,Z,W) to represent generic inputs (see FIG. 5). Another and less generic example would be a blur filter, which would nearly certainly require the radius of a blur as an input parameter. Yet other examples are input color, input intensity, input saturation etc. (see list of filters for more examples in context). CISL and the API for Core Image necessarily provide users and programs the ability to set these input parameters, which allows the predictable creation or editing of an image.

Referring to our iPhoto seashore example, we were performing a blur on an area of our photo. While precise input parameters would depend upon the specific blur filter, iPhoto would most likely need to supply a radius of blur.

5. Ask for Output of a Filter.

In one embodiment, once a graph exists for a particular filter, a program may call Core Image for the output of that filter. In response, Core Image will create an object ready for just-in-time compilation and then execution typically just on the GPU. This output of the high-level filter is simply an un-calculated or representative image. In alternative embodiments, Core Image may either optimize the graph or calculate the image at this point. The prior embodiment is often preferred because, optimization requires processing cycles and calculation will use processing cycles and memory. These resources are usually better to preserve until we are certain that the image must be rendered to context.

Referring to our iPhoto example in the typically more preferred embodiment (saving memory and processor time), iPhoto would call Core Image to produce the un-calculated image, ready for just-in-time compilation and execution.

a. A Caveat to Creating the Filter Output.

Like many graphic processing engines, Core Image may likely be built to operate in only one color space. Therefore, in order to process a graph, some embodiments must convert the color space to the working color space, and before returning a result, must convert the color space back to its original color. In some embodiments, this conversion is effected on a high-level graph by placing appropriate color conversion high-level filter at the input(s) and output of the high-level graph. In other embodiments, this occurs on a low-level graph, but in a very similar fashion. In the case of the low-level graph a "kernel" or fragment program node for color conversion is placed on the input(s) and output of the graph. On most embodiments where nodes are placed into the graphs (high or low-level), the situation dictates that the result of that color conversion node is very likely to be helpful in the future. Therefore, the results of color conversion nodes should be cached in most embodiments. An alternative to creating graph nodes for color conversion is to program such conversion into one of the Core Image routines.

6. Render an Image to Context.

Ultimately, most images are created for visual use, such as display. Therefore, an extremely common step in this embodiment of image creation is to call for the rendering of the image into some defined context. For most embodiments, Core Image will perform optimization of the graph at this point. In short, optimization may involve any or all of the following: (1) producing a low-level graph, where for conceptualization purposes, nodes of the graph represent fragment programs and the low-level graph defines the relationship between images and fragment programs (this is contrasted to high-level graph that comprises images and high-level filters and their inter-relationship); (2) optimizing for domain of definition; (3) optimizing for region of interest; (4) combining fragment programs to reduce the size of the graph and ultimately the memory space that its execution will require: and (5) comparing the execution requirements of the optimized low-level graph with the resident hardware (GPU, CPU, memory etc.). Once optimized, the low-level graph is compiled and one or more executable objects are produced. As we have discussed, typically there is one executable object for the GPU, however, during optimization or compiling, it may be determined that multiple processors should be employed. After compiling, the resulting objects are executed and the image is rendered to the specified context.

Referring again to our iPhoto example, in order to put the image on the screen, iPhoto will call Core Image to render the object to the screen. In a typical embodiment, this step involves the GPU code running on all the relevant pixels in the image and producing the enhanced photo image. The image may be placed on the screen by placing it in a buffer that is associated with the screen display.

E. Simple Code Examples

For illustration, the following is an example in code showing how Core Image API may be used for a simple exposure filter:

```
CIImage *image, *result;
CIFilter *bright;
CIContext *context;
CGImageRef cgImage;
context = [CIContext contextWithCGLContext: someGLContext];
image = [CIImage imageFromCGImage: someCGImage];
bright = [CIFilter filterWithName:@"CIExposureFilter"];
// filter parameters set via key/value coding
[bright setValue: image forKey: @"inputImage"];
[bright setValue: [NSNumber numberWithFloat: -2.0] forKey:
   @"inputExposure"];
result = [bright outputImage]; // result is still just a "promise"
[context render: result]; // forces evaluation
```

Also for illustration, the following is an example of combining fragments according to an embodiment of the invention.

```
program 1:
MOV r0, program.local[0];                              -- r0 = local variable 0
MUL r1, r0, program.local[1];                          -- r1 = r0 * local
                                                          variable 1
MOV result.color, r1;                                  -- output pixel is r1
program 2:
MOV r0, program.local[0];
TEX r1, fragment.texcoord[0], texture[0], RECT;        -- r1 = sample (texture
 0, coord 0)
MUL r2, r0, r1;                                        -- r2 = r0 * r1
MOV result.color, r2;
combined program:
MOV r0, program.local[0];
MUL r1, r0, program.local[1];
MOV r256, r1;                                          -- save output pixel
MOV r0, program.local[2];
MOV r1, r256;                                          -- replace texture look-
                                                          up by previous output
MUL r2, r0, r1;
MOV result.color, r2;
```

F. Core Image Producing CPU and GPU Code

In compiling high-level filter combinations, Core Image may yield multiple objects for execution during rendering. This feature of Core Image may be widely applicable to systems with multiple heterogeneous processors. For example, it may be useful to perform just-in-time compilation to divide a weather forecast calculation being performed on an operating aircraft. Just-in-time compilation allows an efficiency algorithm to account for the status of the aircraft (flying) when determining which processing resources to use. This general process may be summarized in seven steps although an effective system could operate on a subset of these steps: (1) check which resources are available for employment, such as processors, controllers and memory spaces; (2) evaluate the capabilities of each of the resources: (3) check the operating status of each resource; (4) evaluate the requirements of the current task; (5) analyze the requirements of the task with respect to some or all of the available resources; (6) optimize and compile the software to meet the requirements of the task while increasing the overall efficiency of hardware usage in the system (generally reducing the resources used by the task, but perhaps using under utilized or otherwise un-used resources): and (7) execute the compiled code. It is noteworthy that, depending upon the embodiment, steps one through five may occur at execution time or before, while steps six and seven may be most useful in the process if occurring at or near execution time.

There are virtually infinite applications for this process (whole or truncated) that can consider hardware capabilities, the nature and difficulty of the task and real-time status in determining an efficient division of work. Notwithstanding those virtually infinite applications, there are three common reasons that Core Image will produce CPU code. One of those is for emulating a GPU on the CPU and that is discussed later. The second reason is for strict efficiency by using the CPU to do offline rendering. The final reason is for absolute necessity, such as when the task exceeds the hardware ability of the GPU (this is also discussed some in a later place).

Given that the first and third reasons are discussed elsewhere, we briefly discuss the second reason here by providing an example. A central benefit to multiple processors is the ability to work in parallel. When the application program presents tasks requiring serial application of filtering routines, parallelism is most easily established. By example, referring to FIG. 7(a), there is a chart show the timing of a CPU and GPU working serially on a 6 frame sequence. For purposes of this example, there are two effects being sequentially applied to each frame, the CPU applied the first effect and the GPU applies the second effect. The GPU starts frame one while the GPU is idle or working on something else. After the first effect is applied to frame 1, the frame is passed to the GPU to apply the second effect. While the GPU applies the second effect to frame 1, the CPU is applying the first effect to frame 2. The process continues (shown in chart 7(*a*)) so that simple parallelism is used to very efficiently exploit hardware and quickly apply two effects to a stream. Referring to FIGS. 7(*b*) and 7(*c*), there are shown similar charts conveying the efficiency of applying four effects either with four processors (FIG. 7(*b*)) or two processors (FIG. 7(*c*)). It is noteworthy that the nesting in FIG. 7(*c*) can be arranged in many ways and applied to any number of processors with any number of effects. The efficiency is realized through serializing the application of effects. The efficiency can be further enhanced if the work required for each effect is optimally suited for the processor performing the task. For example, in FIG. 7(*a*), if the CPU were better suited for applying the second effect, then the order of frame processing between the CPU and GPU would be reversed.

G. CISL

As described above, aspects of the present disclosure include editing or otherwise manipulating multimedia with a scripting language. As discussed above, a scripting language is a high-level programming language for connecting diverse pre-existing components to accomplish a new related task. The scripting language disclosed presently is preferably interpreted or compiled on-the-fly by another program at runtime.

As discussed above with reference to FIGS. 3(*a*) and 3(*b*), editing multimedia with a scripting language may be carried out by providing a scripting language software suite and associated scripting language, so that scripts written in the associated scripting language, when interpreted by aspects of the scripting language software suite, invoke lower-level software for multimedia manipulation. Invoking lower-level software for multimedia manipulation is often carried out by calling from an interface to one or more external native modules. As described generally above, these external native modules typically include a high-level program interface with graphics filtering functions for editing digital images. External native modules according to aspects of the present disclosure preferably include software exploiting a selected processor in the system to compose a graph-like description of an image task.

While any scripting language software suite invoking any external native module which functions to edit multimedia falls within the scope of the present disclosure, a preferred embodiment of the present invention includes the CISL software suite invoking aspects of Core Image which are discussed in great detail above.

H. Scripting

Figure 8:
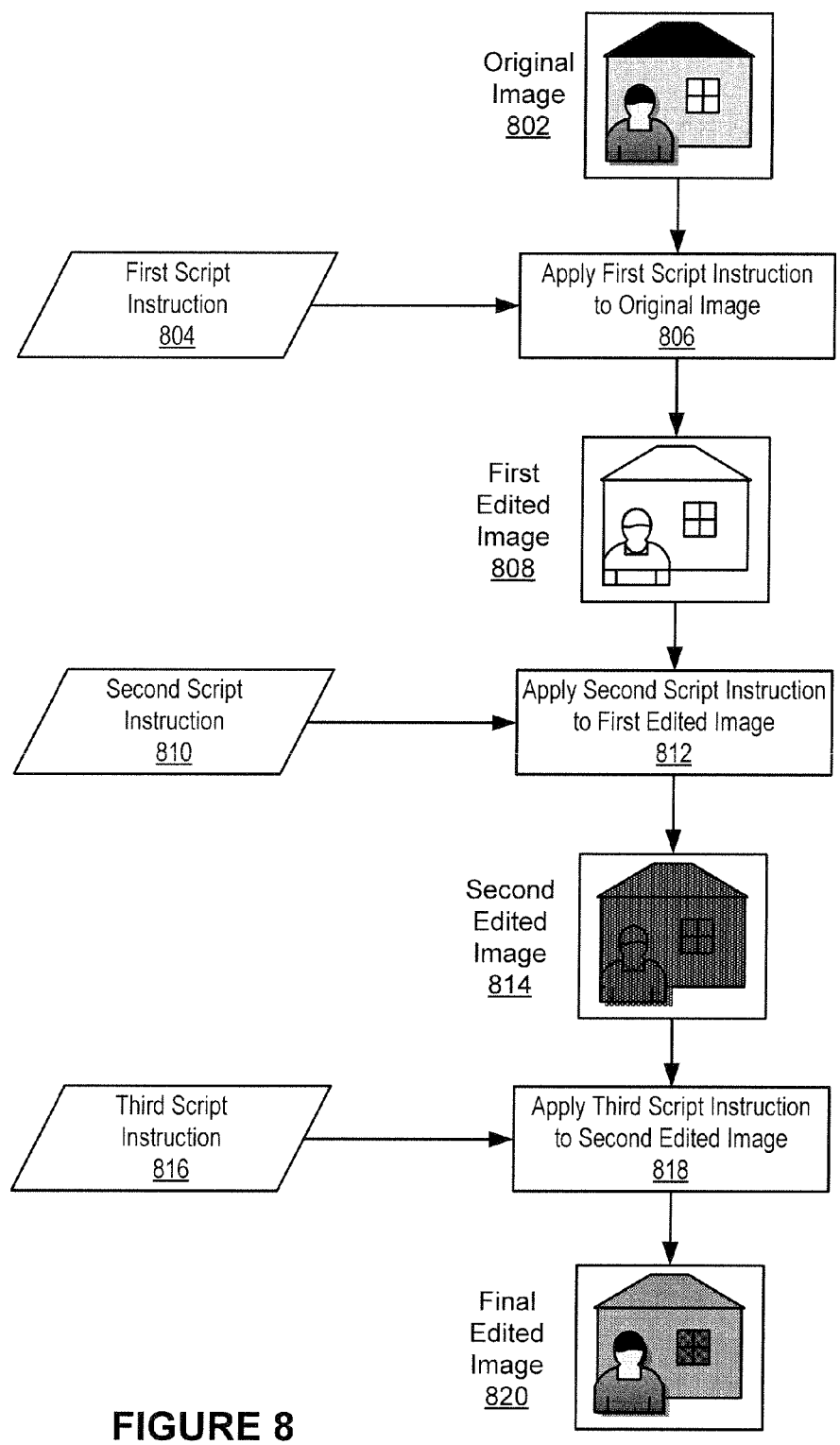

For further explanation, therefore, FIG. 8 sets forth a flowchart illustrating aspects of the CISL software suite according to embodiments of the present disclosure, including manipulating items by invoking graphics filtering functions from Core Image according to CISL script instructions. Although the items of FIG. 8 are embodied as still images 802, 808, 814, and 820, items may include any manipulateable multimedia, such as, for example, video images, audio, or combinations of still images, video images, and audio, in various implementations as will occur to those of skill in the art.

In the method of FIG. 8, manipulating items according to method aspects of the present disclosure is carried out by applying (806, 812, 818) a script instruction 804, 810, 816 to an image 802, 808, 814. Aspects of the present invention as disclosed in FIG. 8 include applying 806 a first script instruction 804 to an original image 802, which results in first edited image 808. A second script instruction 810 is subsequently applied 812 to first edited image 808 to produce second edited image 814. The method concludes by applying 818 a third script instruction 816 to second edited image 814 to produce final edited image 820.

A script instruction is a coherent segment of scripting language which, when evaluated by aspects of a scripting language software suite, effects a result. As discussed with reference to Core Image above, an image is either the two dimensional result of rendering (a pixel image) or a representation of the same.

Applying (806, 812, 818) a script instruction to an image according to the method of FIG. 8 includes evaluating the script instruction, invoking graphics filtering functions from Core Image or other libraries according to the evaluated script instructions, and designating an image to be manipulated according to the evaluated script instructions. Although graphics filtering functions are implemented in FIG. 8 as Core Image, any external native module which functions to edit multimedia, such as, for example, OpenGL, is well within the scope of the present disclosure.

Designating an image to be manipulated according to the evaluated script instructions may mean designating a single image or a set of images, including, for example, a set of all the images to be displayed on a monitor for a predetermined period of time. Alternatively, a set of images may be designated by or until the occurance of an event, or a set of images may be designated until the evaluation of contrary script instructions. Again, although the present disclosure relates to still images, particular embodiments of the present invention may include designation for manipulation of video images, audio, and other multimedia as will occur to those of skill in the art.

Evaluating a script instruction may be carried out by either compiling on-the-fly- or interpreting the script instruction. Evaluating this segment of scripting language may include retrieving the script instruction from storage, as a text file or otherwise, or accepting the script instruction into a text-based interface, as discussed in greater detail below.

1. Filter Replicating Script Generation

As described in various embodiments above, CISL is adapted generally to invoke aspects of Core Image's high-level program interface according to evaluated scripts, including exploiting a selected processor in the system to compose a graph-like description of an image task. Aspects of the CISL software suite may also be capable of, in some embodiments, tracking or analyzing the use of filter graphs on an image, parsing the filter graphs, and creating a representative script which may later be used to invoke the same filter graphs.

Analyzing the use of filter graphs on an image may be carried out by evaluating an edited image formatted as an original image and a representation of the graphs applied for editing the original image, and identifying representations of the applied graphs. Tracking the use of a filter graph may be carried out by maintaining a filter graph log and logging the application of filter graphs to any particular image in the log according to the image.

Parsing the use of filter graphs may be carried out by referencing each logged application of a filter graph for a particular image in a lookup table organized by filter graph, and obtaining the corresponding script instruction.

Consider, for illustration, the following exemplary use case of creating scripts according to a history of invoked filter graphs. The user edits an image on a CISL GUI adapted for editing images according to aspects of the present disclosure.

In this use case, a user actuates particular aspects of the CISL software suite by clicking a mouse on a check-box. These particular aspects of the CISL software suite track the user's interaction with the GUI, such as clicking a mouse on a "clockwise rotation" radio button nine times. Each click on the "clockwise rotation" radio button rotates the image five degrees. Between the fourth and fifth selection of the "clockwise rotation" radio button, the user clicks on the "Sepia-Tone" button of the GUI with his mouse. The user concludes editing the image by clicking the "Twilight" radio button of the GUI and enlarging the image by typing 640 and 480 into a "Scale L:" text box and "Scale W:" text box on the GUI, respectively.

Aspects of the CISL software suite parse log entires indicating that the Clockwise Rotation function has been invoked nine times, references that each application of this function results in a five degree rotation, and generates the following script for a 45-degree image rotation:

:=≠CIAffineTransform inputImage:#application.inImage inputTransform:[rotate:45.0]

Aspects of the CISL software suite further parse log entries indicating that the SepiaTone function has been invoked, and generates the following script:

:=CISepiaTone<#application.inImage

Aspects of the CISL software suite further parse log entries indicating that the Twilight function has been invoked, and generates the following script:

```
#maskImage = @CIHeightFieldFromMask inputRadius:20.0
inputImage:#application.inImage
#spotLight = @CIColorMonochrome inputImage:#maskImage
inputIntensity:1.0 inputColor:[1.0 0.72 0.0 1.0]
#tintedImage = @CISoftLightBlendMode inputImage:#spotLight
inputBackgroundImage:(@CIWhitePointAdjust inputImage:
#application.inImage inputColor:[1.0 1.0 0.8 1.0])
:= @CIMultiplyBlendMode inputImage:(@CILinearGradient
inputPoint0:[0 880] inputPoint1:[0 100]) inputBackgroundImage:
#tintedImage
```

Aspects of the CISL software suite further parse log entries indicating that the Scale function has been invoked, with the parameters (640,480), and generates the following script:

```
:=@CISLScaleFilter inputImage:#application.inImage inputWidth:640
inputHeight:480 inputPreserveAspectRatio:1
```

The scripts generated by aspects of the CISL software suite may be output to a file. A user may use the scripts of this file to recreate the sum total image effect which has been applied to the original image, so that such an image effect may be applied to any other image.

J. Integrated in Applications

In some embodiments, the scripting functionality as described above may be integrated with any application, such as in a preferred embodiment, an application that calls for manipulating items, like Apple Computer's iPhoto application. In aspects of the present invention, therefore, manipulating an item may be carried out in an application by evaluating CISL script instructions, as is described with reference to FIG. 9(a) below. Alternatively, a user may manipulate an item simply by using the GUI and functionality of the application; and then the effect of that manipulation may be transcribed into one or more CISL scripts for re-creation of the effect from the initial item, as is described with reference to FIG. 9(b) below.

Items which may be manipulated may include multiple still images, video images, audio, or any other multimedia items which will occur to those of skill in the art, and manipulation may include associating two or more multimedia items, which may be of a different type. For example, a still image may be associated with video images and audio in a script, so that video and audio are capable of being played synchronously with a still image overlay.

Figure 9A:
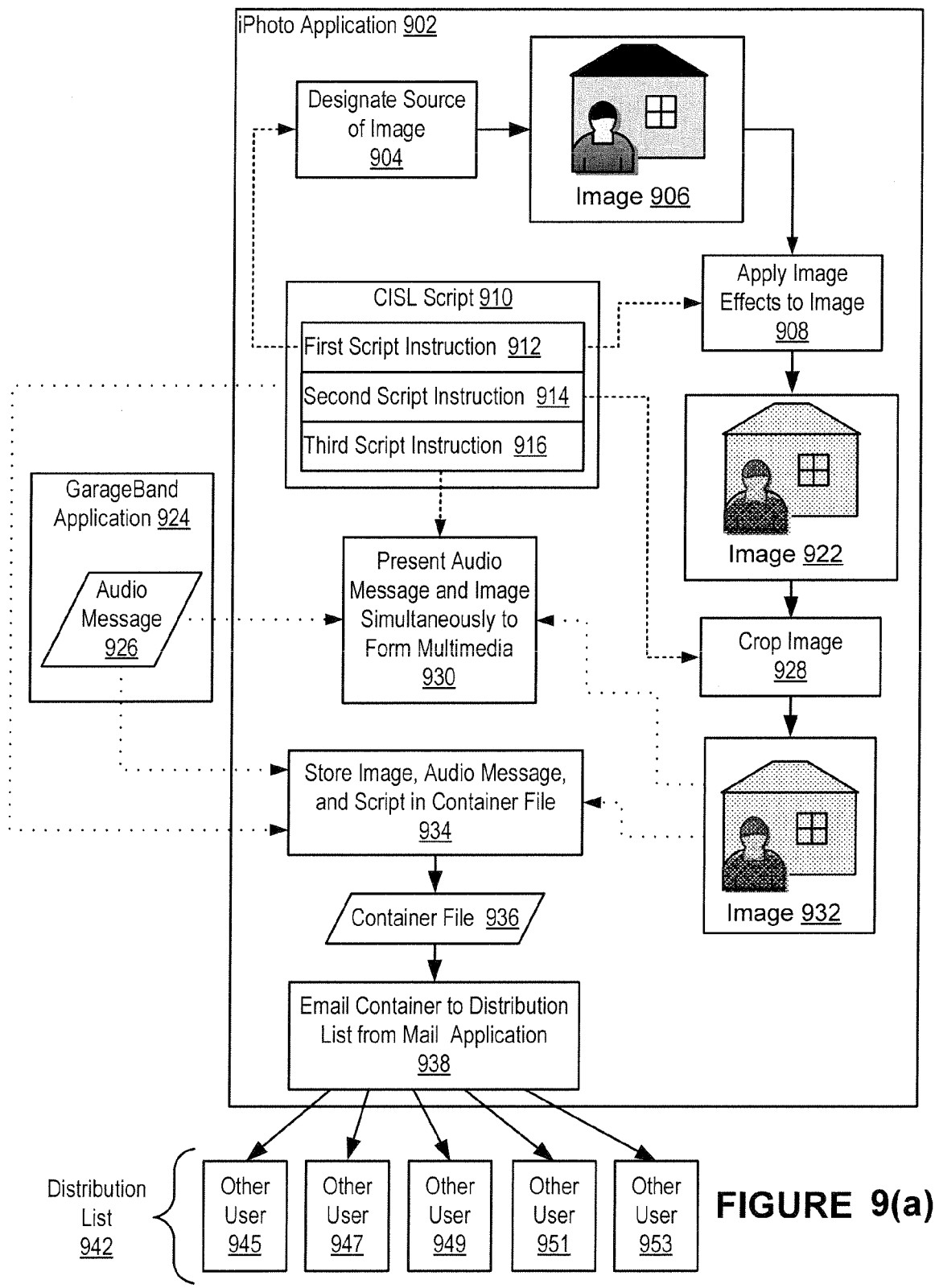
FIG. 9 sets forth a flow chart illustrating an exemplary method for manipulating an item according to the embodiments of the present disclosure.

For further explanation, FIG. 9(a) sets forth a flow chart illustrating an exemplary method for manipulating an item in the Apple iPhoto application according to the present disclosure. Manipulating an item in the Apple iPhoto application according to the method of FIG. 9(a) includes the functional steps of (i) designating the source of an image, (ii) applying image effects to the image, (iii) cropping the image, (iv) associating audio with the image, and (v) emailing the image, the audio, along with a script that manipulates both the image and the audio to a distribution list. Although FIG. 9(a) illustratively takes place in iPhoto, the method of FIG. 9(a) may be carried out by any software application.

Manipulating an item in the Apple iPhoto application according to the method of FIG. 9(a) includes editing the image by applying script instructions to an original image, resulting in an edited image, as described above with reference to FIG. 8. In the method of FIG. 9(a), some of the functional steps of manipulating the image 904 in the iPhoto application 902 are invoked by evaluating the script instructions which make up a CISL script 910, including the first script instruction 912, the second script instruction 914, and the third script instruction 916. Other steps of manipulating the image 904 in the iPhoto application 902 are carried out by native software of the iPhoto application. In the method of FIG. 9(a), each script instruction of CISL script 910, when evaluated, provides for the invocation of one or more of the functional steps of manipulating the image 904. Readers of skill in the art, however, will recognize that in some embodiments, the evaluation of more than one script instruction may be required to perform the functional steps of manipulating an image 904 according to the method of FIG. 9(a).

In the method of FIG. 9(a), a CISL script is used to manipulate a selected image in a manner specified by the CISL script. A user, for example, could use the script in FIG. 9(a) to perform a series of manipulations on any selected image. If a user wished to manipulate a series of images from a birthday party for friends, the user, from the iPhoto application 902, could use CISL to apply an effect to an image in iPhoto (which is a picture of a birthday party), crop it to a standard size, and create a script associating the image with an audio message of children singing a birthday song. The iPhoto application could then create a container and place the image, the audio message, and the script into the container. The iPhoto application could then email the container to all of the user's friends on a distribution list. Of course, the iPhoto application needn't rely solely on its native code. Rather, a framework associated with CISL can handle execution of the script and invoke other system resources as desired.

Manipulating the item according to the method of FIG. 9(a) includes designating (904) the source of an image. Designating (904) the source of an image is invoked by the evaluation of a first script instruction 912. Designating (904) the source of an image according to the method of FIG. 9(a) includes designating an image 906 created by the Apple iPhoto application 902 and stored in an Apple iPhoto data structure associated with this application. Although the iPhoto application is discussed presently, any image in any format may be manipulated according to the method of FIG. 9(a). In this example, the image could be a picture from a birthday party.

Manipulating the item according to the method of FIG. 9(a) further includes applying (908) image effects to the image 906. Applying (908) image effects to the image 906 is invoked by the evaluation of a first script instruction 912. Applying (908) image effects to the image 906 may be carried out by retrieving the designated image 906 and invoking the application of graphics filtering functions, such as, for example, those graphics filtering functions included in aspects of Core Image above, to the the image 906, resulting in image 922. Image 922, in some embodiments, may be stored as a container file containing both the original image 906 and a representation of the graphics filtering functions applied to the original image 906. In this manner of formatting, the original data stays untouched, and allows further editing of any of the applied manipulations based on original data. Of course, any known method of associating files may be substituted for the container file.

In the present example, the image effect could be the Sepia-Tone filter, to produce images with a nostalgic feel.

Manipulating the item according to the method of FIG. 9(a) further includes cropping the image. Cropping (928) the image 922 is invoked by the evaluation of a second script instruction 914. Cropping (928) the image 922 may be carried out by retrieving image 922 and invoking the application of graphics filtering functions used for cropping, such as, for example, filtering functions implemented in iPhoto, to the the image 922, resulting in image 932. Image 932, in some embodiments, may be stored as a container file containing both image 922 and a representation of the graphics filtering functions applied to image 922. Cropping images to a standard size may be done to facilitate standard formatting by the recipient who may use the images in his or her own digital photo album.

Manipulating the item according to the method of FIG. 9(a) further includes presenting (930) an audio message 926 and the image 932 simultaneously to form multimedia. The audio message 926 could be an audio file queried from another application or simply any audio file accessible to the system. In a preferred embodiment, the audio message 926 could be created by any audio processing application, such as Apple Computer's GarageBand application 924. The audio message 926 could be children singing a birthday song. Presenting (930) an audio message 926 and the image 932 simultaneously is invoked by the evaluation of a third script instruction 918. The script 934 may present the image 932 and the audio message 926 simultaneously.

Manipulating the item according to the method of FIG. 9(a) further includes creating a container file 936 (to the extent necessary) and storing (934) the image 906, the audio message 926, and the script 910 in the container file 936. Creating a container file and storing (934) multimedia assets in the container file 936 is carried out in the method of FIG. 9(a) by the iPhoto application 902. Creating a container file 936 and storing (934) assets in the container file 936 may be carried out by retrieving the files containing the image 932, the audio message 926, and the script 934 and encoding the files using an encoding. The container file 936 allows the original image 906 and the audio message 926 to be stored along with the script 934 for displaying the image 906 as the edited image 932 and presenting it simultaneously with the audio message 926, thereby forming a multimedia item.

Manipulating the item according to the method of FIG. 9(a) further includes emailing (938) the container file 936 to a distribution list 942, or in other words, emailing (938) the container file 936 to other users 945, 947, 949, 951, 953 on a distribution list 942. Emailing (938) the container file 936 to a distribution list is carried out in the method of FIG. 9(a) by the iPhoto application 902. Emailing (938) the container file 936 to a distribution list may be carried out by retrieving the container file 936, creating an email addressed to members of the distribution list, and encoding the container file 936 using binary encoding, such as, for example, binary-to-hexidecimal (BinHex), and sending the email. The email may also contain standard or automatically generated message text and subject line relating to the files. Thus, the email containing the files from above is emailed to all of the user's friends in the distribution list 942. Perhaps, more importantly, the email comprises the scripting information necessary for the recipients (the distribution list 945, 947, 949, 951, 953) to be able to receive the email and, utilizing aspects of the present invention, have the multimedia item presented to them. Additionally, in some embodiments of the invention, the users may extract the original image 906 and the original audio message 926, which they may then re-edit and combine with other multimedia assets as desired. This ability to extract the original media is derived from the inclusion of that media in the container. Note that, if the media was modified prior to sending, then this ability would be absent. However, under the teachings of the current invention, the CISL script sent with the original multimedia assets performs the edits to the multimedia assets on a system local to the mail recipient. Therefore, the recipient possesses both a copy of the original media and the instructions to modify and combine the media as intended by the script creator.

The user could alternatively designate the source of an image, followed by cropping the image, then applying image effects to the image, then emailing the image to a distribution list from an email application, and then finally creating a script associating the image with an audio file. The user may use CISL scripts to choose multimedia items, such as, for example, a video, several images, and a song, on an application level; edit the chosen items on an individual item level; and effect the disposition of the edited items, by presenting and emailing them, for example, on a system-level. Indeed, a virtually infinite number of possible combinations of multimedia manipulations exist. These combinations may include any number of any type of manipulations, whether of system-level, application-level, or single-item in scope, that may be applied by the user to any type and any number of multimedia items in any combination and any order.

Although manipulating an item according to aspects of the present disclosure may be carried out in an application by evaluating CISL script instructions, as is described with reference to FIG. 9(a) above, manipulating an item according to aspects of the present disclosure may be carried out alternatively by use of some other item manipulation functionality of the application, the effect of which is transcribed into one or more CISL scripts for re-creation of the effect from the initial item.

Figure 9B:
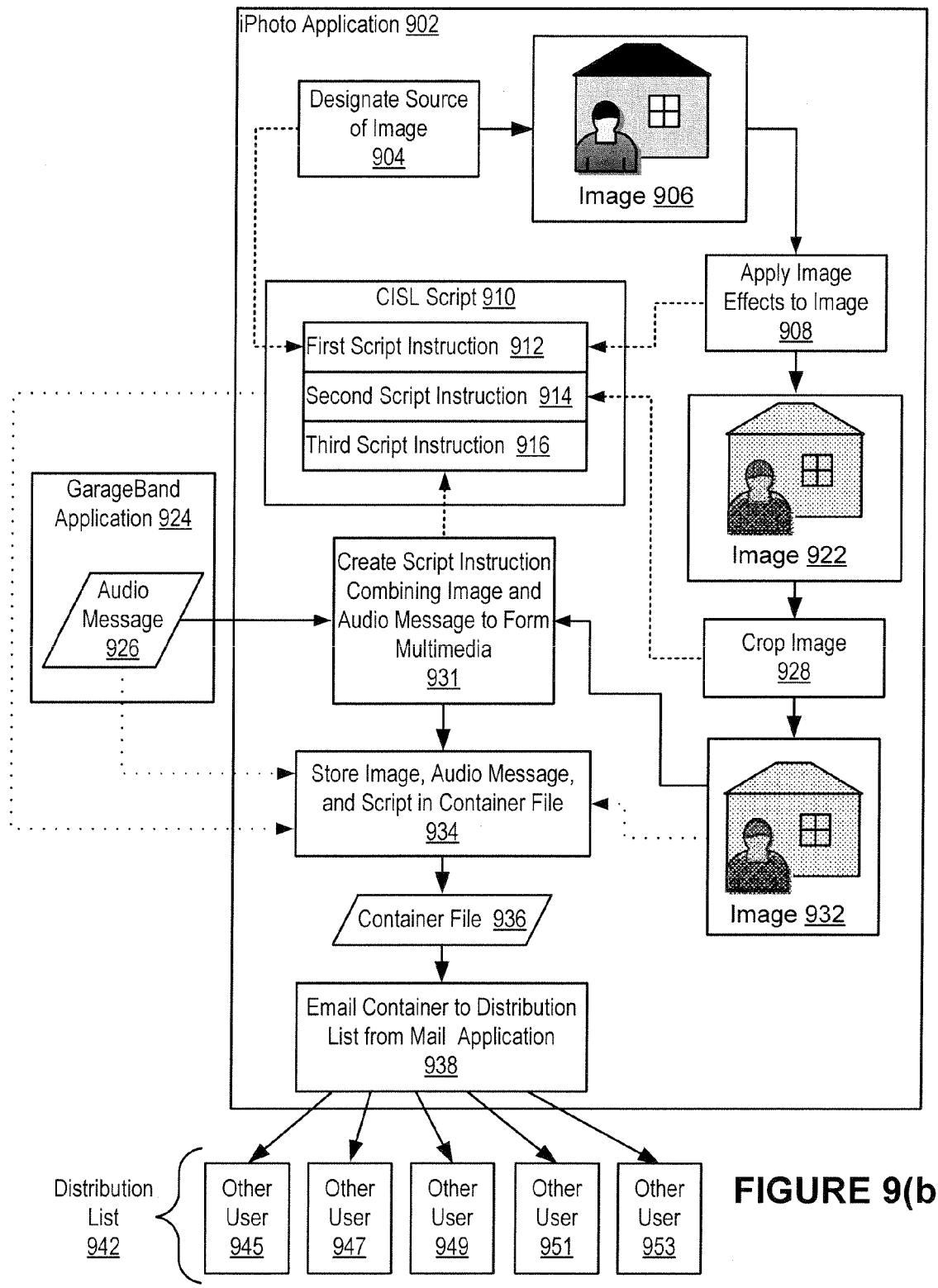

For further explanation, FIG. 9(b) sets forth a flow chart illustrating an exemplary method for manipulating an item in the Apple iPhoto application according to the present disclosure. Manipulating an item in the Apple iPhoto application according to the method of FIG. 9(b) includes the same functional steps of the method of 9(a): designating the source of an image, applying image effects to the image, cropping the image, associating audio with the image, and emailing the image, the audio, and a script manipulating both the image and the audio to a distribution list. However, the method of 9(b) does not use CISL scripts to invoke software processes.

Like the method of FIG. 9(a), the method of FIG. 9(b) may be carried out by any software application.

Similar to the method of 9(a), manipulating an item in the Apple iPhoto application according to the method of FIG. 9(b) includes editing the image. In the method of FIG. 9(b), however, all the steps of manipulating the image 904 in the iPhoto application 902 are carried out by native software of the iPhoto application and not by applying script instructions. The steps of manipulating the image 904 which are carried out by the iPhoto application 902 are transcribed according to the method of 9(b) into script instructions using filter replicating script generation as described in Section I above.

In the method of FIG. 9(b), a user manipulates a selected image in a manner specified by the user's instructions to the iPhoto GUI. A user could use graphical user interface ("GUI") of the iPhoto application to perform a series of manipulations on any selected image. If a user wished to manipulate a series of images from a birthday party for friends, the user, from the iPhoto application 902, could use the GUI to apply an effect to an image in iPhoto (which is a picture of a birthday party), crop it to a standard size, and create a script associating the image with an audio message of children singing a birthday song. The application could then create a container and place the image, the audio message, and the script into the container. The user could then email the container to all of the user's friends on a distribution list.

Manipulating the item according to the method of FIG. 9(b) includes designating (904) the source of an image. Designating (904) the source of an image is actuated by a user, such as by a user performing a mouse click on a file icon. Designating (904) the source of an image according to the method of FIG. 9(b) includes designating an image 906 created by the Apple iPhoto application 902 and stored in an Apple iPhoto data structure associated with this application. Although the iPhoto application is discussed presently, any image in any format may be manipulated according to the method of FIG. 9(b). In this example, the image could be a picture from a birthday party.

Manipulating the item according to the method of FIG. 9(b) further includes applying (908) image effects to the image 906. Applying (908) image effects to the image 906 may be carried out, for example, by performing a mouse-click on a radio button in the iPhoto GUI. Applying (908) image effects to the image 906 may be carried out by retrieving the designated image 906 and invoking the application of graphics filtering functions, such as, for example, those graphics filtering functions included in aspects of Core Image above, to the the image 906, resulting in image 922.

Aspects of the CISL software suite, being previously activated by a user, (i) track or analyze user actions such as the application of image effects applied (908) to a designated image 906, (ii) parse the application of those effects, and (iii) create a representative script instruction, first script instruction 912, which may later be used to apply the same effects. Image 922, in some embodiments, may be formatted as a container file containing both the original image 906 and a representation of the graphics filtering functions applied to the original image 906, such as, for example, the first script instruction 912. In this manner of formatting, the original data stays untouched, and allows further editing of any of the applied manipulations based on original data.

Manipulating the item according to the method of FIG. 9(b) further includes cropping (922) the image. Cropping (928) the image 922 may be carried out, for example, by performing a series of mouse operations on the displayed image in the iPhoto GUI. Cropping (928) the image 922 may be carried out by retrieving image 922 and invoking the application of graphics filtering functions used for cropping, such as, for example, filtering functions implemented in iPhoto, to the the image 922, resulting in image 932. As above, aspects of the CISL software suite transcribe the graphics filtering functions carried out by the iPhoto application to a second script instruction 914. Image 932, in some embodiments, may be formatted as a container file containing both the original image 906, and a representation of the graphics filtering functions applied to image 906 to achieve image 932, such as, for example, the first script instruction 912 and the second script instruction 914.

Manipulating the item according to the method of FIG. 9(b) further includes creating (931) a script instruction 916 combining an audio message 926 and the image 932 to form multimedia. The audio message 926 could be an audio file queried from another application, such as Apple Computer's GarageBand application 924. Creating (931) a script instruction 916 is carried out by aspects of the CISL software suite. The first script instruction 912, the second script instruction 914, and the third script instruction 916 may be combined to form a script 910, which may be used to reproduce the cumulative effects applied to the original image 906 to produce the resulting multimedia item created by the user utilizing iPhoto's functionality. The script 910, when evaluated, presents the image 932 and the audio message 926 simultaneously.

Manipulating the item according to the method of FIG. 9(b) further includes creating a container file and storing the image 906, the audio message 926, and the script 910 in the container file. Creating a container file and storing multimedia assets in the container file is carried out in the method of FIG. 9(b) by the iPhoto application 902. Creating a container file and storing multimedia assets in the container file may be carried out by retrieving the files containing the image 906, the audio message 926, and the script 910, and encoding the files using an encoding. The container file allows the original image 906 and the audio message 926 to be stored along with the script 910 for displaying the image 906 as the edited image 932 and presenting it simultaneously with the audio message 926, thereby forming a multimedia item.

Manipulating the item according to the method of FIG. 9(b) further includes emailing (938) the container file 936 to a distribution list 942, or in other words, emailing (938) the container file 936 to other users 945, 947, 949, 951, 953 on a distribution list 942. Emailing (938) the container file 936 to a distribution list is carried out in the method of FIG. 9(b) by the iPhoto application 902. Emailing (938) the container file 936 to a distribution list may be carried out by retrieving the container file 936, creating an email addressed to members of the distribution list, and encoding the container file 936 using binary encoding, such as, for example, binary-to-hexidecimal (BinHex), and sending the email. The email may also contain standard or automatically generated message text and subject line relating to the files. Thus, the email containing the files from above is emailed to all of the user's friends in the distribution list 942.

As in the method of 9(a), other users on the distribution list 945, 947, 949, 951, and 953 may then be able to receive the email and, utilizing aspects of the present invention, have the multimedia item presented to them. Additionally, the users may obtain the original image 906 and the original audio message 926, which they may then re-edit and combine with other multimedia assets as desired.

K. CISL Syntax Capabilities

CISL syntax capabilities correspond closely with the capabilities of Core Image, such as, for example, the creation of an image. CISL allows for the creation of an image represented by a variable. CISL syntax further allows for the assignment of a filter or a concatenation of filters to a variable. Variables in CISL are designated with a pound sign "#," such as in the following representation in CISL of the variable noiseImage:

noiseImage.

By default, CISL variables may be used for individual instances, providing maximum granularity. A variable may alternatively be designated as an application variable or a system variable, providing powerful application-wide or system-wide settings respectively. The ability to adjust the granularity of variables makes CISL a powerful, yet easy-to-use scripting language for non-programmers. Consider the two CISL variables below:

system.DeviceRGBColorSpace
application.inImage

The system variable "system.DeviceRGBColorSpace" is denoted as a system variable in CISL by the prefix "system." appended to the variable to the right of the pound sign "#." The application variable "#application.inImage" is denoted as an application variable in CISL by the "application." prefix appended to the variable to the right of the pound sign "#."

In some embodiments, the user exploits a high-level program interface by creating effects or specifying filter functions from a pre-defined list by using the scripting language. In aspects of the present disclosure, a filter is expressed in CISL by its name, such as, for example, "CISepiaTone," with the "at symbol," "@," as a prefix, as shown below.

@CISepiaTone

A filter may also be expressed with an optional output key. Consider the exemplary expression of a filter with an output key in CISL below.

outputMaxValue@CIImageAnalyzer

The filter name "CIImageAnalyzer" in the expression "outputMaxValue CIImageAnalyzer" is denoted in CISL by the appended prefix "@." The output key, the prefix "outputMaxValue," is appended to left of the filter expression "CIImageAnalyzer."

If no output key is defined, as in the first filter name example above, the default "outputImage" output key is used. Filters typically also have parameters. A filter typically has its default parameters set but a specific value can be specified following the filter name where the parameter name is followed by a desired value.

@CISepiaTone Power:0.5

In CISL, a filter or a concatenation of filters may be assigned to a variable. An assigment is specified by the equals sign, "=." Consider the following illustration of an exemplary assignment:

sepiaToneImage=@CISepiaTone inputImage:#application.inImage

The filter CISepiaTone, denoted in the assignment as "@CI*SepiaTone," is applied to the input image (application variable "#application.inImage") as is denoted by the language, "CISepiaTone inputImage:#application.inImage." The result of the application of the CISepiaTone filter to the input image is assigned to the variable "#sepiaToneImage" to the left of the equal sign.

CISL provides for creation of a context, such as, for example, memory such as video memory associated with a system's graphics functions, corresponding with the same capability in Core Image. The result of the script is then rendered by Core Image. The result of the script is represented in CISL as an assignment to ":", as shown below:

:=@CIColorWheel

The result of the filter CIColorWheel, as denoted in CISL as "CIColorWheel," is represented as an assignment to ":", which is denoted in CISL by the snippet of script ":=" appended to the filter representation "@CIColorWheel."

We refer generally to a context as output, and therefore the ability to create a context is derived from tools that allow definition of an object in memory. Although aspects of the present embodiment found in CISL primarily contemplate memory such as video memory associated with a system's graphics functions, the concepts discussed here apply equally to any memory or storage found elsewhere in the system or accessible to the system. Therefore, without limitation, memory may include all types of solid state memory such as dynamic memory or static memory, any type of memory which may be utilized by Core Image, or any other type of memory as will occur to those of skill in the art.

Filters may be concatenated with each other in CISL by scripting with the "less than" operator, "<." The result of the output key of the filter to the right is assigned to the inputImage of the filter to the left, as is shown in the following illustration of an exemplary concatenation of filters below.

bluredges=@CIZoomBlur<#CIEdges Image:#sepiaToneImage

The output of the filter CIEdges, denoted as "@CIEdges Image," applied to the image sepiaToneImage, denoted as variable "Image:#sepiaToneImage," is then acted on by filter CIZoomBlur, denoted as "@CIZoomBlur." The result of this concatenation of filters is then assigned to the variable bluredges, denoted in CISL by "#bluredEdges."

CISL also supports inlining, wherein the result of a filter may be used as a parameter of another filter. In this way, new filters can be created. To declare the scope of parameters, the inlined filter is enclosed with brackets, "( )". Images may be assigned by variables, such as, for example, default environment maps from the application or system space, or by a file path enclosed in quotes as shown in the exemplary illustration of an image assigned by the file path below.

bluredges=@CIZoomBlur<@CIEdges Image:"~/Pictures/myImage.tif"

The scripting language may also be capable of adding filters to the pre-defined list.

Looking now more fully at the capabilities of CISL, in one embodiment, CISL provides six high-level functions for the application developer and end user: creation of a context; creation of an image; creation of a filter; the ability to set parameters associated with filter, such as, for example, the arguments of a filter function; the ability to ask for the output of a filter or group of filters that has been assembled; and the ability to render an image to a context. In this embodiment, CISL is capable of exploiting all the basic functions of Core Image.

The capability of CISL to set application-wide and system-wide variables and to combine multiple filters provides increased utility to image editing. One setting where such capabilities are useful can often be found in the publishing industry where all incoming images have to be gamma adjusted, tone level adjusted to be within the specification of the output media, and have an unsharp mask applied. Such an example requires at least three filters to be chained together. But the same image is often used for different output media, such as print and Internet, which require different filter parameters or different filter chains. In that environment, CISL coupled with Core Image would be an efficient image editor.

L. Scripting Interface

1. Introduction

In certain embodiments as discussed above, invoking lower-level software for multimedia manipulation is carried out by calling from an interface to one or more external native modules, typically including a high-level program interface with graphics filtering functions for editing digital images. In greater particularity, a CISL interface makes API calls to one or more modules in the Core Image software suite to invoke Core Image's graphics filtering functions. The CISL interface may alternatively make API calls to other external native modules. These modules typically include software exploiting a selected processor in the system to compose a graph-like description of an image task.

2. User-Interfaces

Invoking graphics filtering functions from Core Image may be carried out by calling from an interface to external native modules written in a traditional compiled language, such as Core Image modules. In some embodiments, this interface is a user interface which may be implemented using any text-input graphical user interface (GUI) accepting text as a script for runtime evaluation, such as, for example, AppleScript Studio on the Mac OS X operating system. AppleScript is the Mac OS scripting interface, which operates in parallel with the standard Mac OS graphical user interface. The user interface aspect of the present disclosure may also be a graphical user interface particularly adapted to implement CISL.

Figure 10:
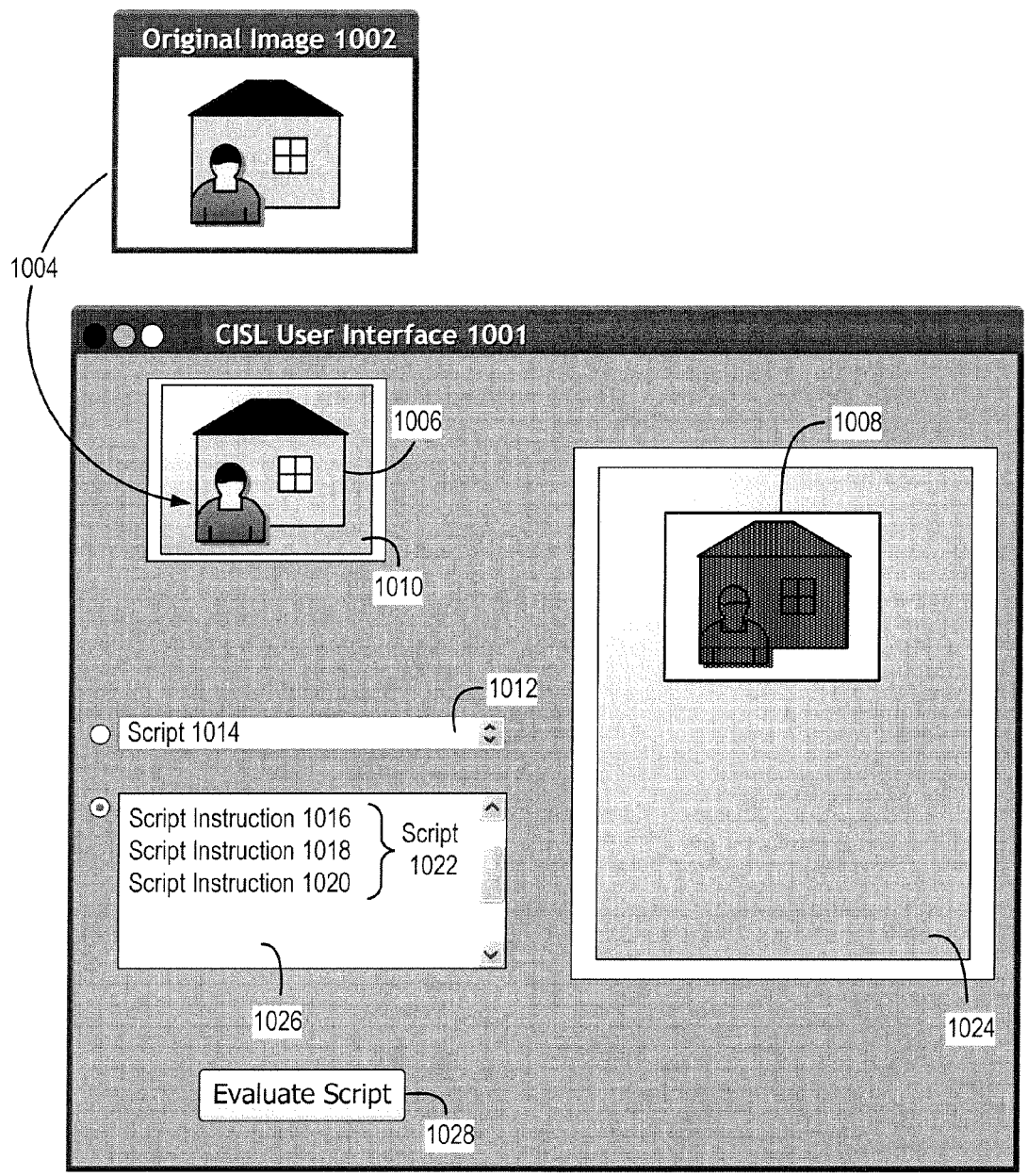
FIG. 10 sets forth an exemplary graphical user interface (GUI) illustrating aspects of the CISL software suite according to embodiments of the present disclosure.

For further explanation, therefore, FIG. 10 sets forth an exemplary graphical user interface (GUI) illustrating aspects of the CISL software suite according to embodiments of the present disclosure. The GUI 1001 of FIG. 10 includes a graphical input box, a graphical output box, a pull-down menu, a text-input box, and an evaluate script button. The GUI 1001 of FIG. 10 is enabled to accept images which may be input by a user through a file input tool. Input of an image into GUI 1001 is accomplished by a user performing a drag-and-drop operation 1004: dragging original image 1002 from the desktop to the graphical input box 1010 and dropping the original image there. Drag-and-drop operation 1004 creates a copy 1006 of original image 1002 in graphical input box 1010, with the original image 1002 remaining on the desktop. In alternate embodiments, the original image 1002 may be moved into the graphical input box 1010 instead of copied.

GUI 1001 also includes a graphical output box 1024. Graphical output box 1024 displays an edited copy 1008 of the original image 1002. The edited copy 1008 of the original image 1002 is the presentation of the original image 1002 as edited by script 1022 or script 1014. If original image 1002 has not yet been edited, graphical output box 1024 may contain no image or a copy of original image 1002. GUI 1001 of FIG. 10 is adapted so that edited copy 1008 may be copied to a file by means of drag-and-drop. GUI 1001 may also contain, in addition or in the alternative, a "save" or "copy" radio button (not shown) which saves a copy of edited image 1008 to a file.

GUI 1001 also includes two script input tools. The first script input tool is a pull-down menu 1012. Pull-down menu 1012, when activated by a mouse click, is enabled to provide a scrolling menu of scripts for user selection. The user selects a script from the scrolling menu. Pull-down menu 1012 may be populated with all available scripts in a particular script library file. The script library file may contain all available scripts or a sub-group of scripts, such as the most-used scripts, the latest used scripts, or other sub-groups as will occur to those of skill in the art. The last-selected script 1014 in pull-down menu 1012 is displayed. Pull-down menu 1012 also includes a radio button which enables the user to select between scripting with pull-menu 1012 or text-input box 1026, which also includes a radio button.

The second script input tool is text-input box 1026. Text-input box 1026 of GUI 1001 is a script input tool that is enabled to accept a script (1022) from a user. Script 1022 is made up of script instructions 1016, 1018, 1020. The user may input script 1022 into text-input box 1026 by clicking on the text-input box 1026 and entering text. Text-input box 1026 includes text-editing features which are well-known in the prior art.

GUI 1001 also includes an "Evaluate Script" button 1028, which is enabled to actuate aspects of the CISL software suite to edit original image 1002. As discussed in detail above, the CISL software suite edits original image 1002 by evaluating either script 1014 in pull-down menu 1012 or script 1022 in text-input box 1026, depending on which radio button is selected, invoking aspects of the Core Image software suite, and rendering edited image 1008 in graphical output box 1024.

Although graphical user interface 1001 is shown in FIG. 10 to be implemented to accept images, in some embodiments of the present disclosure the graphical user interface is adapted to accept any multimedia item, such as groups of images, video images, audio, or any other multimedia item as will occur to those of skill in the art. Such implementations may accept multimedia items by drag-and-drop or selection on a file menu of items, which may be represented by icons.

In further embodiments, the interface may be a soley non-text-based GUI accepting a designation of pre-defined scripts or a combination or those pre-defined scripts for runtime evaluation. Such non-text-based GUIs may include, for example, pull-down menus, windows, icons, radio buttons, checkboxes, and scrolling input displays.

Both the text-based and non-text-based GUIs may be adapted for batch conversion of files using Core Image. This batch conversion may be carried out by invoking a particular set of graphics filtering functions from Core Image to edit a batch of files according to a CISL script.

Figure 11A:
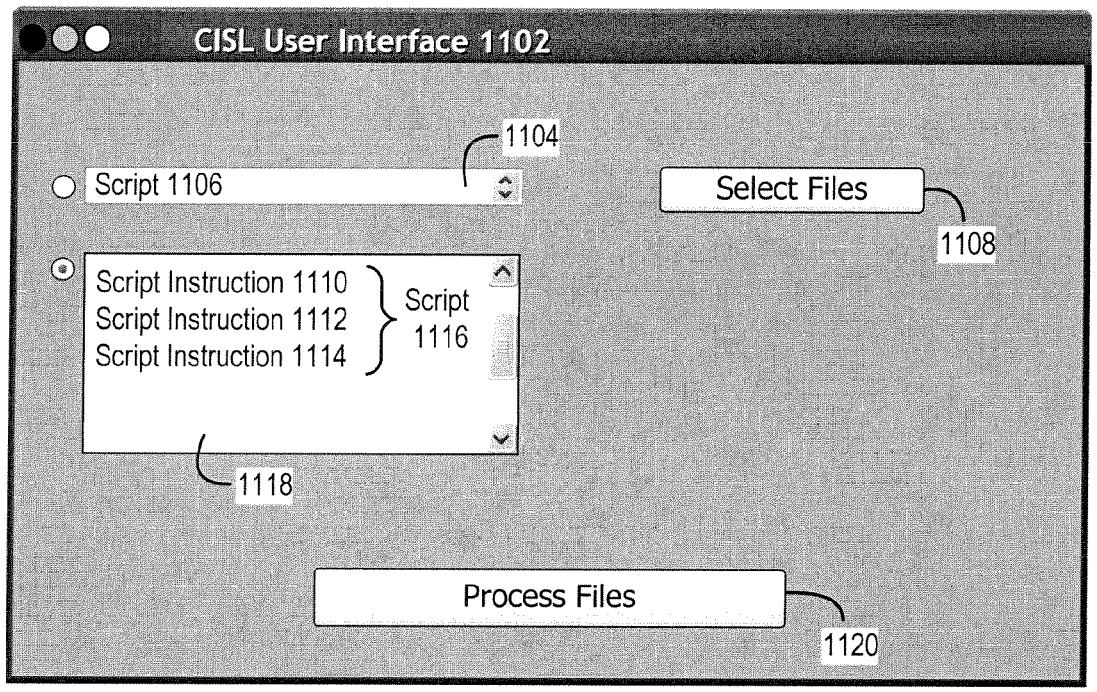
FIGS. 11(a) and 11(b) set forth an exemplary graphical user interface (GUI) illustrating aspects of the CISL software suite according to embodiments of the present disclosure, including batch conversion of files.

For further explanation, therefore, FIG. 11 sets forth an exemplary graphical user interface (GUI) illustrating aspects of the CISL software suite according to embodiments of the present disclosure, including batch conversion of files. Graphical user interface (GUI) 1102 of FIG. 11 includes two script input tools. The first script input tool is a pull-down menu 1104. Pull-down menu 1104, when activated by a mouse click, is enabled to provide a scrolling menu of scripts for user selection. The user selects a script from the scrolling menu. Pull-down menu 1104 may be populated with all available scripts in a particular script library file. The script library file may contain all available scripts or a sub-group of scripts, such as the most-used scripts, the latest used scripts, or other sub-groups as will occur to those of skill in the art. The last-selected script 1106 in pull-down menu 1104 is displayed. Pull-down menu 1104 also includes a radio button which enables the user to select between scripting with pull-menu 1104 or text-input box 1118, which also includes a radio button.

The second script input tool is text-input box 1026. Text-input box 1118 of GUI 1102 is a script input tool that is enabled to accept a script 1116 from a user. Script 1116 is made up of script instructions 1110, 1112, 1114. The user may input script 1116 into text-input box 1118 by clicking on the text-input box 1118 and entering text. Text-input box 1118 includes text-editing features which are well-known in the prior art.

Figure 11B:
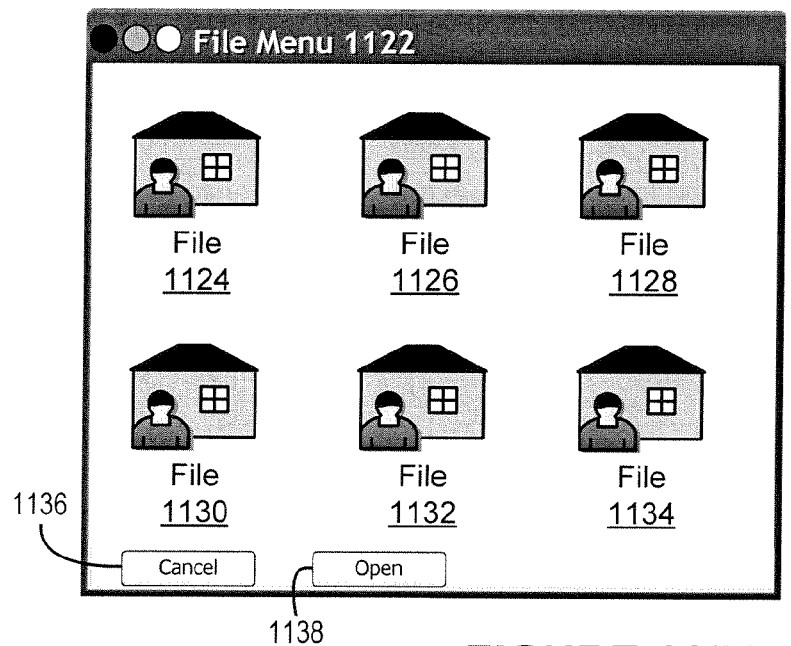

GUI 1102 also includes a "Select Files" button 1108, a file input tool which is enabled to open a file menu window 1122 in FIG. 11(b). Turning now to FIG. 11(b), file menu window 1122 contains files represented by icons 1124, 1126, 1128, 1130, 1132, and 1134. These files may contain any type of multimedia. File menu 1122 is enabled to allow user selection of multiple files for batch conversion by the CISL software suite. After selection of one or more files, the user may enter this selection and close the file menu window 1122 by clicking on the "Open" button 1138 with the mouse. Alternatively, the user may cancel his selection and close the file menu window 1122 by clicking on the "Cancel" button 1136 with the mouse.

GUI 1001 also includes a "Process Files" button 1120, which is enabled to actuate aspects of the CISL software suite to edit selected files. As discussed in detail above, the CISL software suite edits original image 1002 by evaluating either script 1106 in pull-down menu 1104 or script 1116 in text-input box 1118, depending on which radio button is selected, invoking aspects of the Core Image software suite, and editing selected files 1008.

3. Developers

Alternatively, instead of being invoked from a user-level interface, CISL's scripting language may be used in applications in place of a standard graphics filtering API. In some embodiments, only three API calls are required to incorporate the CISL into an application. In such an example, a developer may exploit CISL's user-friendly syntax to utilize Core Image's powerful filtering functions. In specific embodiments, CISL is part of the QuartzCore framework. The QuartzCore framework includes Quartz Compositor, the windowing system that is responsible for the user interface in Mac OS X. In these embodiments, CISL may be available to every application on the system.

M Core ImageGraphing

As described in various embodiments above, CISL is adapted generally to invoke aspects of Core Image's high-level program interface including exploiting a selected processor in the system to compose a graph-like description of an image task. CISL may also be capable of creating a Core Image graph from this graph-like description. Upon creation of a Core Image graph, Core Image may evaluate an image calculation task by evaluating the associated Core Image graph.

As discussed above, Core Image may create a Core Image graph from the graph-like description by effecting a disposition of the high-level descriptions (or reference thereto) in a data structure that we shall call a high-level graph. Particular embodiments of CISL are capable of invoking Core Image in dependence upon scripts to place high-level descriptions or associated references into a high-level graph. The high-level graph is assembled by aspects of CISL, according to scripts, creating a new filter and defining relationships between the pre-defined filters and images being employed in the new filter. When CISL has completed building the high-level graph, it has effectively completed the tasks for creating the new filter. That is to say that all the information necessary to create the new filter is embodied in the high-level graph. Alternatively, a Core Image graph may be parsed to define a user-level script which could be used to recreate the Core Image graph.

In another alternative embodiment, as a programmer or program assembles a graph in cooperation with Core Image, the graph created may be a low-level graph or substantially a low-level graph. For example, from the perspective of the program or programmer, a request may be made for a high-level filter, however, Core Image may create and deliver an object that is a low-level filter or some interim step between a low-level filter and a high-level filter. Since the program or programmer does not actually inspect the object, Core Image can respond to requests for high-level code with low-level code. In this manner, Core Image may assemble a low-level graph while a program believes to be working with high-level filters and objects.

N. Sample Script List

At various points in the specification, we have referred to scripts. The following is an illustrative list of such scripts. This list and the accompanying parameters are provided for illustration and completeness of discussion. Regarding the inventors' implementations of the aforementioned innovations, each of the listed scripts may or may not be used or modified. Furthermore, more scripts may be created and those may differ materially from that disclosed.

```
------------- Script # 1: ColorWheelComposite -------------
:=@CIMultiplyCompositing inputImage:(@CISepia Tone inputImage:#application.inImage)
inputBackgroundImage:#application.inImage
------------- Script # 2: Gamma18_640×480 -------------
#gammaImage = @CIGammaAdjust inputImage:#application.inImage inputPower:1.8
:=@CISLScaleFilter inputImage:#gammaImage inputWidth:640 inputHeight:480
inputPreserveAspectRatio:1
------------- Script # 3: Rotate45 -------------
:=@CIAffineTransform inputImage:#application.inImage inputTransform:[rotate:45.0]
------------- Script # 4: Sepia -------------
:=@CISepiaTone < #application.inImage
------------- Script # 5: Twilight -------------
#maskImage = @CIHeightFieldFromMask inputRadius:20.0 inputImage:#application.inImage
#spotLight = @CIColorMonochrome inputImage:#maskImage inputIntensity:1.0 inputColor:[1.0
0.72 0.0 1.0]
#tintedImage = @CISoftLightBlendMode inputImage:#spotLight
inputBackgroundImage:(@CIWhitePointAdjust inputImage:#application.inImage
inputColor:[1.0 1.0 0.8 1.0])
:= @CIMultiplyBlendMode inputImage:(@CILinearGradient inputPoint0:[0 880] inputPoint1:[0
100]) inputBackgroundImage:#tintedImage
------------- Script # 6: Scale_640×480 -------------
:=@CISLScaleFilter inputImage:#application.inImage inputWidth:640 inputHeight:480
inputPreserveAspectRatio:1
------------- Script # 7: ShadowText -------------
#invertedMask = @CIMaskToAlpha < @CIColorInvert < #application.inImage
#bluredMask = @CIGaussianBlur inputRadius:2.0 inputImage:@CIMaskToAlpha <
#application.inImage
#firstComposite = @CISourceInCompositing inputBackgroundImage:#bluredMask
```

-continued

```
inputImage:@CIConstantColorGenerator inputColor:[0.0 0.0 0.0 1.0]
#secondComposite = @CISourceInCompositing inputImage:(@CIAffineTransform
inputImage:#firstComposite inputTransform:[translate: 2.0 −2.0])
inputBackgroundImage:#invertedMask
:=@CISourceOverCompositing inputImage:#secondComposite
inputBackgroundImage:@CIConstantColorGenerator inputColor:[0.2 0.2 1.0 1.0]
------------- Script # 8: ChromeText -------------
#alphaMask = @CIMaskToAlpha < @CIColorInvert < #application.inImage
#shadedImage = @CIShadedMaterial inputImage:(@CIHeightFieldFromMask
inputImage:#alphaMask inputRadius:35.0) inputShadingImage:"/Volumes/Data/ball.tiff"
inputScale:5.0
:= @CISourceOverCompositing inputImage:#shadedImage
inputBackgroundImage:@CIConstantColorGenerator inputColor:[0.0 0.0 1.0 0.5]
------------- Script # 9: CompositeStarShine -------------
:=@CIMultiplyCompositing inputBackgroundImage:(@CIStarShineGenerator)
inputImage:#application.inImage
------------- Script # 10: RedHighlights -------------
#maskImage = @CIHeightFieldFromMask inputRadius:10.0 inputImage:#application.inImage
#spotLight = @CISpotLight inputImage:#maskImage inputBrightness:7.9 inputColor:[1.0 0.0
0.0 1.0]
:= @CIDifferenceBlendMode inputImage:#spotLight
inputBackgroundImage:#application.inImage
```

I. Sample Filter List

At various points in the specification, we have referred to an illustrative list of filters. The following many pages are devoted to that list. This list and the accompanying parameters are provided for illustration and completeness of discussion. Regarding the inventors' implementations of the aforementioned innovations, each of the listed filters may or may not be used or modified. Furthermore, more filters may be created and those may differ materially from that disclosed.

I claim:

1. A method for scripting via an interface to a programmable processing device, comprising the steps of:
   providing an interface to one or more programmable processing units communicatively coupled to each other in a programmable processing device comprising a script input tool for inputting one or more scripts and a file input tool for inputting one or more first original multimedia items for batch manipulation by the one or more programmable processing units;
   accepting from the script input tool an input of one or more scripts, said scripts written in a scripting language, said scripting language comprising variables representing one or more multimedia items and a manipulation to be applied to the one or more multimedia items;
   accepting from the file input tool a representation of one or more first original multimedia items;
   creating an association between the first original multimedia items and said input scripts; and
   storing the association in a container file comprising the input scripts and the first original multimedia items wherein the container file acts as a proxy for one or more result multimedia items after the manipulation has been applied,
   wherein the container file as the proxy is referenced to render the one or more result multimedia items, and is referenced as one or more second original multimedia items in at least one other script for batch manipulation.

2. The method of claim 1 further comprising evaluating the input scripts at runtime and invoking a process for manipulating the first original multimedia items in dependence upon the input scripts extracted from the container file.

3. The method of claim 2 wherein the process for manipulating multimedia items in dependence upon the script further comprises the steps of:
   a first process requesting a filter from a second process;
   said first process defining a relationship between said filter and at least one of said first multimedia items, said related filter and first multimedia item(s) comprising a program,
   said second process compiling said program, yielding a compiled program; and
   running at least a portion of said compiled program to apply a function of said filter to said multimedia item.

4. The method of claim 1 wherein said association is created on a first computer system and further comprising the step of transferring a portion of said input scripts to a second computer system.

5. The method of claim 4 wherein said transfer comprises the substep of sending an email.

6. The method of claim 4 wherein said transfer comprises the substep of sending a message over a wireless network.

7. The method of claim 4 wherein said transfer comprises the substep of uploading the input scripts over a network.

8. The method of claim 4 wherein said plurality of application programs comprise an image editor program and an email program.

9. The method of claim 1 further comprising the step of creating a second association between a portion of said input scripts and one or more second multimedia items.

10. The method of claim 1 wherein inputs are user inputs.

11. The method of claim 1 wherein creating an association is performed in batches of multimedia items.

12. The method of claim 1 wherein said one or more input scripts may be associated with a plurality of application programs.

13. The method of claim 12 wherein said plurality of application programs comprise an image editor program and an email program.

14. A method for representing an altered original multimedia item in a programmable processing device, comprising the steps of:
   creating a script for processing one or more original multimedia assets, said script comprising scripting instructions to cause the derivation of altered multimedia assets from original multimedia assets;
   creating a first association between said original multimedia assets and said script, said first association representing said altered multimedia assets;

storing said script in a portion of a container file on a programmable storage device accessible to the programmable processing device;

augmenting the container file to enable it to act as a proxy for the altered multimedia assets, said container file comprising the original multimedia assets and the script; and storing the container file as a proxy for the altered multimedia assets, wherein the container file as the proxy is referenced to render the altered multimedia asset, and is referenced as one or more second original multimedia assets in at least one other script for batch manipulation.

15. The method of claim 14 wherein said container file further comprises scripting instructions as well as detailed program instructions for applying a multimedia effect.

16. The method of claim 15 wherein said detailed program instructions for applying a multimedia effect comprise an image filter.

17. The method of claim 14 further comprising the step of creating a second association between said script and second original multimedia assets.

18. The method of claim 17 further comprising the step of running said script in connection with said second association.

19. The method of claim 14 further comprising the step of creating a batch association set comprising a plurality of associations, each such association being between said script and one of a batch set of multimedia items.

20. The method of claim 14 wherein said script may be associated with a plurality of application programs.

21. The method of claim 20 wherein said plurality of application programs comprise an image editor program and an email program.

22. The method of claim 20 wherein said plurality of application programs comprise an image editor program and an instant messaging program.

23. The method of claim 20 wherein said plurality of application programs comprise an image editor program and a wireless messaging program.

24. A method for multimedia scripting in a computer system, comprising the steps of:

presenting a script, written in a scripting language, comprising a variable representing one or more multimedia items and a manipulation to be applied to the one or more multimedia items, wherein the scripting language comprises syntax enabling system-wide application of the manipulation;

evaluating the script after extraction from a container file at runtime via an interface to one or more programmable processing units communicatively coupled to each other in the computer system;

invoking a plurality of processes for manipulating multimedia items in dependence upon the script, each such process associated with one or more multimedia types;

processing a first multimedia type with a first process; and processing a second multimedia type with a second process, wherein the script is referenced to render one or more result multimedia items, and is referenced as one or more second original multimedia items in at least one other script for batch manipulation.

25. The method of claim 24 wherein the scripting language further comprises syntax enabling invocation of the manipulation by a plurality of application programs present in the system.

26. The method of claim 24, wherein a multimedia item comprises a still image.

27. The method of claim 24, wherein a multimedia item comprises video.

28. The method of claim 24, further comprising effecting a disposition of the edited multimedia in dependence upon the script.

29. The method of claim 28, wherein said disposition comprises storing the manipulated multimedia item as a file.

30. The method of claim 28, wherein said disposition comprises associating said manipulated multimedia item with an email.

31. The method of claim 28, wherein said disposition comprises associating said manipulated multimedia item with an instant message.

32. The method of claim 24, wherein the process for manipulating multimedia items further comprises the steps of:

a first process requesting a filter from a second process;

said first process defining a relationship between said filter and said multimedia item, said related filter and multimedia item comprising a program, said second process compiling said program, yielding a compiled program; and running at least a portion of said compiled program to apply a function of said filter to said multimedia item.

33. A method for multimedia scripting via an interface to a programmable processing device, comprising the steps of:

presenting a script, extracted from a container file and written in a scripting language, comprising a variable representing one or more multimedia items and a manipulation to be applied to the one or more multimedia items, wherein the scripting language comprises syntax enabling involvement of one or more application programs;

invoking a process on one of one or more programmable processing units of the programmable processing device for making a graph in dependence upon the script, wherein said graph defines a relationship between (i) one or more filter functions and (ii) one or more of said multimedia items; and using the graph as a proxy for the manipulated multimedia items, wherein the graph as the proxy is referenced to render the one or more result multimedia items, and is referenced as one or more second original multimedia items in at least one other script for batch manipulation.

34. The method of claim 33 wherein the multimedia item is an image.

35. The method of claim 33 wherein the multimedia item is an audio file.

36. The method of claim 33 wherein invoking a process for making a graph in dependence upon the script further comprises:

optimizing the graph;

compiling the optimized graph; and causing the rendering of said compiled optimized graph into a context.

37. A method for multimedia script generation via an interface to a programmable processing device, comprising the steps of:

evaluating a graph on one or more programmable processing units communicatively coupled to each other in the programmable processing device, said graph representing multimedia items and filter functions applied to such items;

creating script instructions based upon said graph, wherein each script instruction comprises the application of a filter function to at least one multimedia item to yield a result, wherein the graph is referenced to render the one or more result multimedia items, and is referenced as one or more second original multimedia items in at least one other script for batch manipulation.

38. A method for multimedia scripting via an interface to a programmable processing device, comprising the steps of:

providing a graphical user interface, said graphical user interface comprising a script selection tool for selecting one or more scripts;

accepting from the script selection tool a user selection of one or more scripts from the script selection tool, said scripts written in a scripting language, comprising a variable representing one or more multimedia items and a manipulation to be applied to the one or more multimedia items, wherein the scripting language enables invocation of the manipulation by a plurality of application programs;

said scripts represented to the user by information indicative of said manipulation;

evaluating the script at runtime; and invoking a process on one or more programmable processing units communicatively coupled to each other in the programmable processing device for manipulating multimedia items in dependence upon the script, wherein the script is referenced to render the one or more result multimedia items, and is referenced as one or more second original multimedia items in at least one other script for batch manipulation.

39. The method of claim 38 wherein the accepted script comprises syntax enabling system-wide invocation of the manipulation.

40. The method of claim 38 wherein the information indicative of said manipulation is graphical.

41. The method of claim 38 wherein the information indicative of said manipulation is textual.

* * * * *